US009079352B2

(12) United States Patent
Sumi et al.

(10) Patent No.: US 9,079,352 B2
(45) Date of Patent: Jul. 14, 2015

(54) DUCT MOLDING METHOD AND DUCT

(75) Inventors: Takehiko Sumi, Ebina (JP); Tadatoshi Tanji, Fujisawa (JP); Masaaki Onodera, Yamato (JP); Tatsuya Fukuda, Tokyo (JP); Sho Nakajima, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 404 days.

(21) Appl. No.: 13/230,150

(22) Filed: Sep. 12, 2011

(65) Prior Publication Data

US 2012/0060960 A1    Mar. 15, 2012

(30) Foreign Application Priority Data

Sep. 14, 2010   (JP) .................. 2010-206137
Jan. 31, 2011   (JP) .................. 2011-019031
Jan. 31, 2011   (JP) .................. 2011-019034
Mar. 29, 2011   (JP) .................. 2011-073061

(51) Int. Cl.
    *B29C 51/08*    (2006.01)
    *B29C 51/26*    (2006.01)
    (Continued)

(52) U.S. Cl.
    CPC ............ *B29C 51/261* (2013.01); *B29C 47/0021* (2013.01); *B29C 47/0054* (2013.01); *B29C 47/366* (2013.01); *B29C 51/02* (2013.01); *B29C 51/267* (2013.01); *B29C 47/0004* (2013.01); *B29C 47/004* (2013.01); *B29C 47/0019* (2013.01); *B29C 47/084* (2013.01); *B29C 47/165* (2013.01); *B29C 47/34* (2013.01); *B29C 47/54* (2013.01); *B29C 49/0005* (2013.01); *B29C 49/041* (2013.01); *B29C 51/10* (2013.01); *B29C 51/303* (2013.01); *B29C 2049/047* (2013.01); *B29C 2049/4294* (2013.01); *B29C 2791/001* (2013.01); *B29C 2791/006* (2013.01); *B29C 2947/926* (2013.01); *B29C 2947/9259* (2013.01); *B29C 2947/92647* (2013.01); *B29C 2947/92857* (2013.01); *B29C 2947/92904* (2013.01); *B29C 2947/92923* (2013.01); *B29C 2947/92933* (2013.01); *B29K 2023/06* (2013.01); *B29K 2023/12* (2013.01); *B29K 2096/04* (2013.01); *B29K 2101/12* (2013.01);
    (Continued)

(58) Field of Classification Search
    None
    See application file for complete search history.

(56) References Cited

U.S. PATENT DOCUMENTS 4,192,701 A  *  3/1980  Martin et al. ................. 156/285
4,722,820 A  *  2/1988  Flecknoe-Brown ....... 264/210.2
(Continued)

FOREIGN PATENT DOCUMENTS

JP    04-164609    6/1992
JP    08-323787    12/1996
(Continued)

OTHER PUBLICATIONS

Japan Office Action, mail date is Oct. 7, 2014 and partial translation thereof.
(Continued)

*Primary Examiner* — Monica Huson
(74) *Attorney, Agent, or Firm* — Greenblum & Bernstein, P.L.C.

(57) ABSTRACT

The present invention provides a duct molding method by which it is possible to improve the adhesion of a sheet. In the duct molding method of the present invention, a molten thermoplastic resin sheet is positioned between molds. Subsequently, the thermoplastic resin sheet (P) is absorbed onto cavity surfaces of the molds and the molds are closed. Thereby, a duct is molded.

8 Claims, 28 Drawing Sheets

(51) Int. Cl.
*B29C 51/02* (2006.01)
*B29C 47/36* (2006.01)
*B29C 47/00* (2006.01)
*B29C 47/34* (2006.01)
*B29C 51/10* (2006.01)
*B29K 23/00* (2006.01)
*B29L 23/00* (2006.01)
*B29L 31/30* (2006.01)
*B29K 503/04* (2006.01)
*B29K 96/04* (2006.01)
*B29C 47/08* (2006.01)
*B29C 47/16* (2006.01)
*B29C 47/54* (2006.01)
*B29C 49/00* (2006.01)
*B29K 105/04* (2006.01)
*B29C 51/30* (2006.01)
*B29C 49/04* (2006.01)
*B29C 49/42* (2006.01)
*B29K 101/12* (2006.01)

(52) U.S. Cl.
CPC ........ *B29K 2105/04* (2013.01); *B29K 2223/06* (2013.01); *B29K 2223/12* (2013.01); *B29K 2503/04* (2013.01); *B29L 2023/003* (2013.01); *B29L 2023/004* (2013.01); *B29L 2023/22* (2013.01); *B29L 2031/3032* (2013.01)

(56) References Cited

U.S. PATENT DOCUMENTS 5,168,621 A * 12/1992 Kruck et al. .................... 29/451
5,972,151 A * 10/1999 Sbrana .......................... 156/229
2007/0203300 A1* 8/2007 Sumi et al. .................... 525/240

FOREIGN PATENT DOCUMENTS

| | | |
|---|---|---|
| JP | 11-254509 | 9/1999 |
| JP | 2000-289093 | 10/2000 |
| JP | 2001-213137 | 8/2001 |
| JP | 2001-239824 | 9/2001 |
| JP | 2001-293771 | 10/2001 |
| JP | 2004-122488 | 4/2004 |
| JP | 2005-241157 | 9/2005 |
| JP | 2007-038553 | 2/2007 |
| JP | 2007-231136 | 9/2007 |
| JP | 2009-241528 | 10/2009 |
| JP | 2010-247427 | 11/2010 |
| WO | 2009/157197 | 12/2009 |

OTHER PUBLICATIONS

Japan Office Action, mail date is Sep. 24, 2014 and partial translation thereof.
Japan Office action, dated Jul. 8, 2014, along with an english translation thereof.

* cited by examiner

FIG. 11

| RESIN | MATERIAL COMPOUND RATIO | | | EXPANSION RATIO |
|---|---|---|---|---|
| | RESIN A (X) LONG CHAINED HDPE | RESIN B (Y) LONG CHAINED PP | RESIN C OBC | |
| EXAMPLE 1 | 50 | 50 | | 2.9 TIMES |
| EXAMPLE 2 | 50 | 45 | 5 | 4.2 TIMES |
| EXAMPLE 3 | 50 | 40 | 10 | 4.7 TIMES |
| EXAMPLE 4 | 50 | 30 | 20 | 4.0 TIMES |
| EXAMPLE 5 | 50 | 10 | 40 | 3.7 TIMES |

FIG. 19

| | PP | PP | MFR | TALC | FOLDED BREAKS | PINHOLE |
|---|---|---|---|---|---|---|
| | MANUFACTURER | GRADE | g/10 MINUTES | % | ABSENT /PRESENT | ABSENT /PRESENT |
| EXAMPLE 1 | JAPAN POLYPROPYLENE | EC9 | 0.5 | 15 | ABSENT | ABSENT |
| EXAMPLE 2 | JAPAN POLYPROPYLENE | EC9 | 0.5 | 20 | ABSENT | ABSENT |
| EXAMPLE 3 | JAPAN POLYPROPYLENE | EC9 | 0.5 | 30 | ABSENT | PRESENT |
| EXAMPLE 4 | JAPAN POLYPROPYLENE | EC7 | 1.5 | 8 | ABSENT | ABSENT |
| EXAMPLE 5 | JAPAN POLYPROPYLENE | EC7 | 1.5 | 15 | ABSENT | ABSENT |
| EXAMPLE 6 | JAPAN POLYPROPYLENE | EC7 | 1.5 | 25 | ABSENT | ABSENT |
| EXAMPLE 7 | SUMITOMO CHEMICAL | H501 | 3.0 | 5 | ABSENT | ABSENT |
| EXAMPLE 8 | SUMITOMO CHEMICAL | H501 | 3.0 | 10 | ABSENT | ABSENT |
| EXAMPLE 9 | SUMITOMO CHEMICAL | H501 | 3.0 | 20 | ABSENT | ABSENT |
| COMPARATIVE EXAMPLE 1 | JAPAN POLYPROPYLENE | EC9 | 0.5 | 0 | PRESENT | ABSENT |
| COMPARATIVE EXAMPLE 2 | JAPAN POLYPROPYLENE | EC9 | 0.5 | 10 | PRESENT | ABSENT |
| COMPARATIVE EXAMPLE 3 | JAPAN POLYPROPYLENE | EC7 | 1.5 | 0 | PRESENT | ABSENT |
| COMPARATIVE EXAMPLE 4 | JAPAN POLYPROPYLENE | EC7 | 1.5 | 5 | PRESENT | ABSENT |
| COMPARATIVE EXAMPLE 5 | SUMITOMO CHEMICAL | H501 | 3.0 | 0 | PRESENT | ABSENT |

FIG. 20

| | PP MANUFACTURER | PP GRADE | MFR g/10 MINUTES | TALC % | FOLDED BREAKS | PINHOLE |
|---|---|---|---|---|---|---|
| COMPARATIVE EXAMPLE 6 | JAPAN POLYPROPYLENE | EC9 | 0.5 | 0 | ABSENT /PRESENT | ABSENT /PRESENT |
| COMPARATIVE EXAMPLE 7 | JAPAN POLYPROPYLENE | EC9 | 0.5 | 10 | ABSENT | ABSENT |
| COMPARATIVE EXAMPLE 8 | JAPAN POLYPROPYLENE | EC7 | 1.5 | 0 | ABSENT | ABSENT |
| COMPARATIVE EXAMPLE 9 | JAPAN POLYPROPYLENE | EC7 | 1.5 | 5 | ABSENT | ABSENT |
| COMPARATIVE EXAMPLE 10 | SUMITOMO CHEMICAL | H501 | 3.0 | 0 | ABSENT | ABSENT |

FIG. 25

| TRANSMISSION RATE (mm/s) \ EXTRUSION RATE (mm/s) | 80 | 85 | 90 | 95 | 100 | 105 | 110 | 115 | 120 | 125 |
|---|---|---|---|---|---|---|---|---|---|---|
| 45 | | | | | | | | | t=1.3mm C THICKNESS | t=1.1mm C THICKNESS |
| 40 | | | | | | t=1.3mm C THICKNESS | t=1.2mm C THICKNESS | t=1.1mm C THICKNESS | t=0.90mm B | t=0.85mm B |
| 35 | | | t=1.3mm C THICKNESS | t=1.2mm C THICKNESS | t=1.1mm C THICKNESS | t=1.0mm B | t=0.9mm B | t=0.85mm B | t=0.80mm B | t=0.73mm B |
| 30 | t=1.2mm C THICKNESS | t=1.1mm C THICKNESS | t=1.0mm B | t=0.90mm B | t=0.85mm B | t=0.78mm B | t=0.76mm B | t=0.73mm B | t=0.70mm B | t=0.66mm B |
| 25 | t=0.90mm B | t=0.85mm B | t=0.82mm B | t=0.78mm B | t=0.73mm B | t=0.70mm B | t=0.68mm B | t=0.66mm B | t=0.65mm B | D IMPOSSIBLE TO MOLD |
| 20 | t=0.78mm B | t=0.73mm B | t=0.71mm B | t=0.70mm B | t=0.60mm A | t=0.60mm A | D IMPOSSIBLE TO MOLD | D IMPOSSIBLE TO MOLD | D IMPOSSIBLE TO MOLD | |
| 15 | t=0.65mm B | D IMPOSSIBLE TO MOLD | D IMPOSSIBLE TO MOLD | D IMPOSSIBLE TO MOLD | D IMPOSSIBLE TO MOLD | D IMPOSSIBLE TO MOLD | | | | |

| | 80 | 85 | 90 | 95 | 100 | 105 | 110 | 115 | 120 | 125 |
|---|---|---|---|---|---|---|---|---|---|---|
| 45 | | | | | | | | | 2.7 | 2.8 |
| 40 | | | | | | 2.6 | 2.8 | 2.9 | 3.0 | 3.1 |
| 35 | | | 2.6 | 2.7 | 2.9 | 3.0 | 3.1 | 3.3 | 3.4 | 3.6 |
| 30 | 2.7 | 2.8 | 3.0 | 3.2 | 3.3 | 3.5 | 3.7 | 3.8 | 4.0 | 4.2 |
| 25 | 3.2 | 3.4 | 3.6 | 3.8 | 4.0 | 4.2 | 4.4 | 4.6 | 4.8 | 5.0 |
| 20 | 4.0 | 4.3 | 4.5 | 4.8 | 5.0 | 5.3 | 5.5 | 5.8 | 6.0 | |
| 15 | 5.3 | 5.7 | 6.0 | 6.3 | 6.7 | 7.0 | | | | |

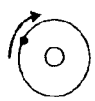

FIG. 27

| | MOLDING METHOD | AVERAGE THICKNESS | | | UPPER AND LOWER THICKNESS DIFFERENCE (mm) | VARIATION COEFFICIENT | WEIGHT INCLUDING BAG (g) | CHANGE OF FLANGE SPACING (mm) | CHANGE OF OPENING (mm) | |
|---|---|---|---|---|---|---|---|---|---|---|
| | | LOWER SIDE (mm) | UPPER SIDE (mm) | UPPER AND LOWER AVERAGE (mm) | | | | | | |
| EXAMPLE 1 | SHEET MOLDING | 0.900 | 1.020 | 0.960 | 0.120 | 0.271 | 964 | −21.00 | 1.490 | VARIATION COEFFICIENT 0.3 OR LESS THICKNESS DIFFERENCE 0.3 OR LESS AVERAGE THICKNESS EXCEEDING 0.7 |
| EXAMPLE 2 | SHEET MOLDING | 0.682 | 0.808 | 0.745 | 0.126 | 0.266 | 800 | −20.90 | 1.470 | VARIATION COEFFICIENT 0.3 OR LESS THICKNESS DIFFERENCE 0.3 OR LESS AVERAGE THICKNESS EXCEEDING 0.7 |
| EXAMPLE 3 | SHEET MOLDING | 0.580 | 0.710 | 0.645 | 0.130 | 0.260 | 724 | −20.11 | 1.100 | VARIATION COEFFICIENT 0.3 OR LESS THICKNESS DIFFERENCE 0.3 OR LESS AVERAGE THICKNESS 0.7 OR LESS |
| EXAMPLE 4 | SHEET MOLDING | 0.495 | 0.574 | 0.535 | 0.079 | 0.252 | 640 | −19.50 | 0.970 | VARIATION COEFFICIENT 0.3 OR LESS THICKNESS DIFFERENCE 0.3 OR LESS AVERAGE THICKNESS 0.7 OR LESS |
| EXAMPLE 5 | SHEET MOLDING | 0.497 | 0.770 | 0.634 | 0.273 | 0.250 | 715 | −26.01 | 1.150 | VARIATION COEFFICIENT 0.3 OR LESS THICKNESS DIFFERENCE 0.3 OR LESS AVERAGE THICKNESS 0.7 OR LESS |
| COMPARATIVE EXAMPLE 1 | SHEET MOLDING | 0.490 | 0.820 | 0.655 | 0.330 | 0.260 | 731 | −31.21 | 1.100 | VARIATION COEFFICIENT 0.3 OR LESS THICKNESS DIFFERENCE EXCEEDING 0.3 AVERAGE THICKNESS 0.7 OR LESS |
| COMPARATIVE EXAMPLE 2 | PARISON BLOW | 1.012 | 1.284 | 1.148 | 0.272 | 0.326 | 1130 | −31.87 | 1.500 | VARIATION COEFFICIENT EXCEEDING 0.3 THICKNESS DIFFERENCE 0.3 OR LESS AVERAGE THICKNESS EXCEEDING 0.7 |

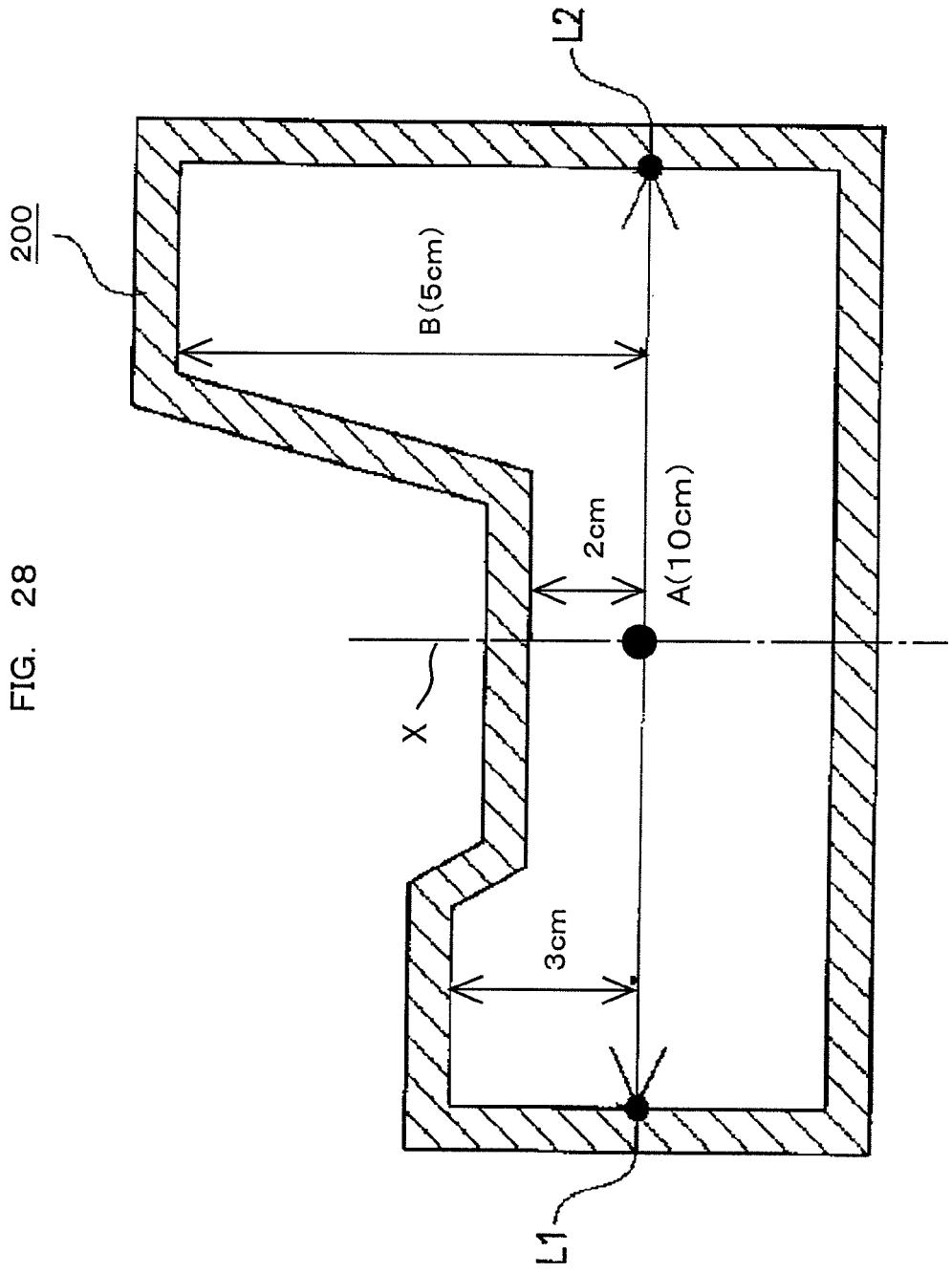

DUCT MOLDING METHOD AND DUCT

BACKGROUND OF THE INVENTION

1. Technical Field

The present invention relates to a duct molded from a thermoplastic resin.

2. Background Art

The following methods are methods of molding a duct, which is an example of a resin molded product. Two premolded sheets are reheated and placed in a molten state between a pair of upper and lower molds. After this, a pressurized liquid is blown in between the two sheets, while closing and adjusting the pair of molds. Consequently, a climate control duct is formed in which the first half and the second half are joined as a single unit.

Furthermore, for example, a sheet blow molding method using a foamed resin sheet is disclosed in JP-A-2001-239824 (Patent Document 1) and JP-A-2000-289093 (Patent Document 2).

In the sheet blow molding method, two thermoplastic resin sheets cut in a predetermined size in advance are heated with an infrared heater and softened. Next, the sheet is pinched-off from the mold. Then, the sheet is attached firmly to the surface of the cavity by the blowing of a pressurized fluid between the sheets. Due to this, the sheet is molded into the desired shape.

However, in the sheet blow molding method mentioned above, sheets prepared in advance in room temperature are softened during sheet blow molding by reheating it with radiant heat sources such as infrared heaters. Therefore, for example, when foamed resin sheets are used, it is difficult for the sheet to be in a uniform molten state including its internal mass. In addition to this, when compared with molten and extruded sheets, the reheated sheets contain less heat. Therefore, not only does this cause poor traceability for the sheet along the mold's cavity, but also inadequate adhesion at each pinched-off section (parting line) of the two sheets.

Furthermore, WO 2009/157197 (Patent Document 3) is an example of the related art by the present applicant. A molding apparatus of molding a resin molded product using a molten thermoplastic resin sheet is disclosed in this document.

Patent Document 3 mentioned above discloses the molding of plate-shaped resin molded product, such as sandwiched panels, using molten thermoplastic resin sheets. However, in this document, no reference is made regarding the molding of a duct.

SUMMARY

An object of the present invention is to provide a duct molding method which enables the improvement in adhesion of sheets, and also to provide a duct.

<Duct Molding Method>

A duct molding method according to an aspect of the invention includes:
 a positioning step in which a molten thermoplastic resin sheet is placed between molds; and
 a molding step in which the thermoplastic resin sheet is adsorbed onto cavity surfaces of the molds and the molds are closed to mold a duct.

<Duct>

A duct according to an aspect of the invention is a duct including:
 a first wall and a second wall adhering to each other along a parting line, wherein
 a difference between an average thickness of the first wall and an average thickness of the second wall is 0.3 mm or less, and
 a variation coefficient of the thickness of the entire duct is 0.3 or less.

Moreover, a duct according to another aspect of the invention is:
 a duct which is formed in such a manner that a mixture of thermoplastic resin with an inorganic filler is melted and mixed, then extruded in a sheet form, and then molded into a shape of a mold, wherein
 the average thickness is 2 mm or less, the duct satisfying the following conditions.

$$30 > W \geq 2M^2 - 11M + 18$$

where,
 M: Melt flow rate (g/10 minutes) of the above-mentioned thermoplastic resin at 230° C.
 W: Inorganic filler volume (wt %) mixed into the above-mentioned thermoplastic resin

BRIEF DESCRIPTION OF THE DRAWINGS

FIG. 11 illustrates an example of a first embodiment;

FIG. 19 is the first diagram explaining an example of the second embodiment;

FIG. 20 is the second diagram explaining the example of the second embodiment;

FIG. 25 illustrates an example of the third embodiment;

FIG. 27 shows the average wall thickness, difference in wall thicknesses, and variation coefficients of the instrument panel duct; and FIG. 28 is a cross-sectional diagram for explaining the blow ratio.

EXEMPLARY EMBODIMENTS (First Embodiment)

<Overview of Method of Molding Duct in First Embodiment>

To begin with, an overview of the duct molding method in the present embodiment is explained with reference to FIGS. 1 through 4.

Figure 1:
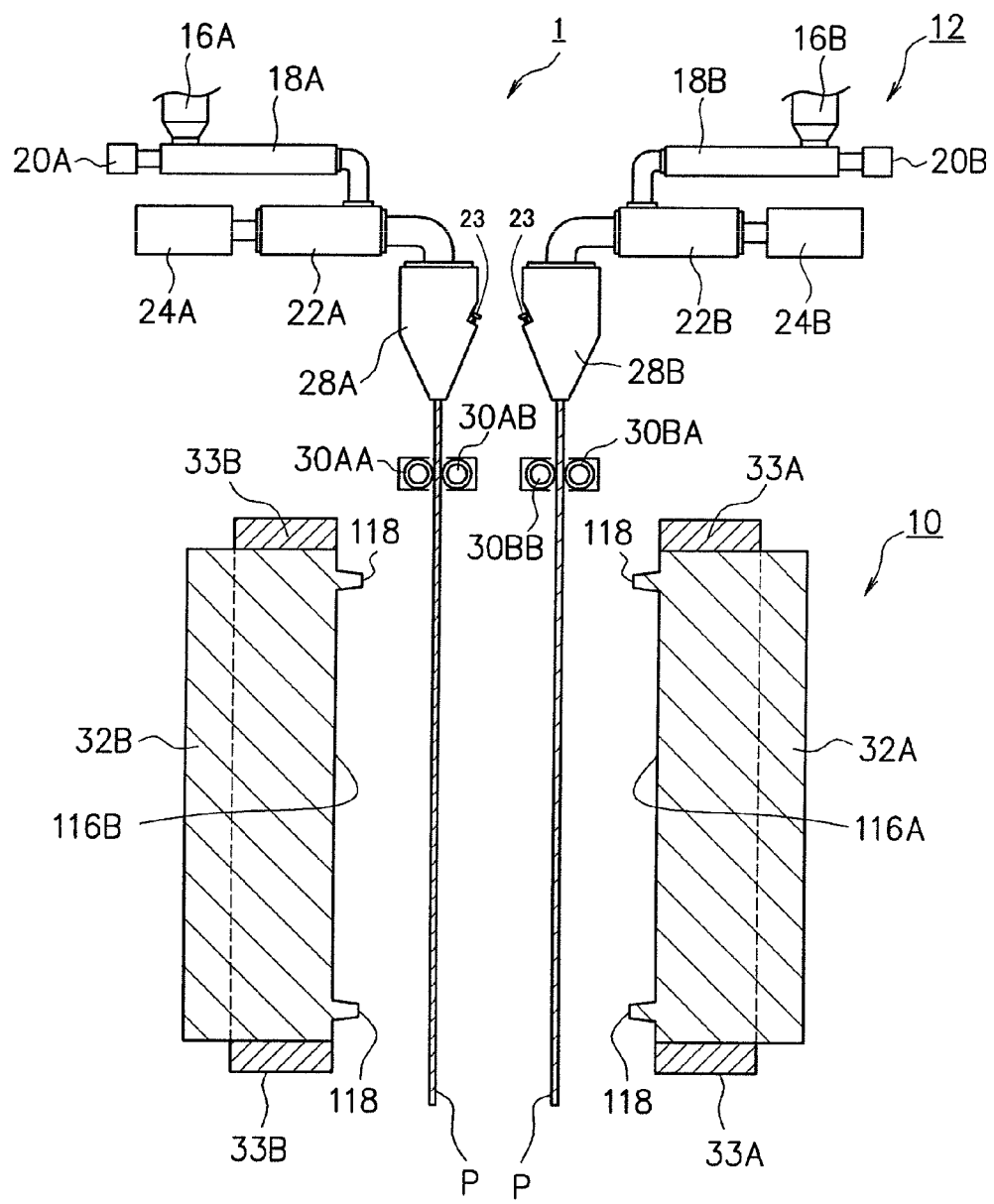
FIG. 1 shows a configuration example of a molding apparatus implementing a method of molding a climate control duct according to the present embodiment.

The duct molding method in the present embodiment is implemented by using, for example, a molding apparatus 1 shown in FIG. 1. First, as shown in FIG. 1, a molten thermoplastic resin sheet P is positioned between a split mold block 32A and a split mold block 32B.

Figure 2:
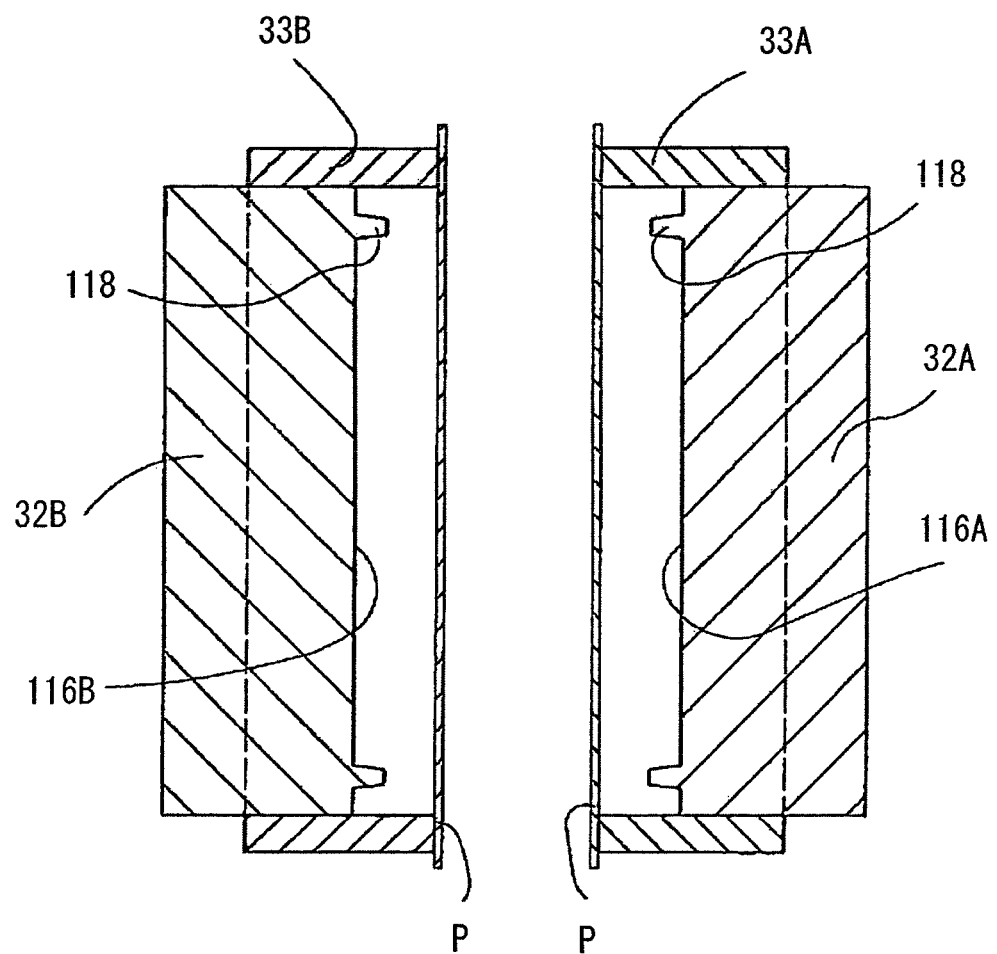
FIG. 2 shows the procedures of the molding apparatus shown in FIG. 1 wherein, a pair of thermoplastic foamed resin sheets is placed within a pair of split mold blocks, and the space between the cavity surfaces of the split mold blocks is closed by a frame.

Next, as shown in FIG. 2, a frame 33A (33B) positioned on the perimeter of the split mold block 32A (32B), is drawn closer to the thermoplastic resin sheet P. Then, the thermoplastic resin sheet P is sucked in using suction parts set in the frame 33A (33B). This bonds the thermoplastic resin sheet P to the frame 33A (33B).

Figure 3:
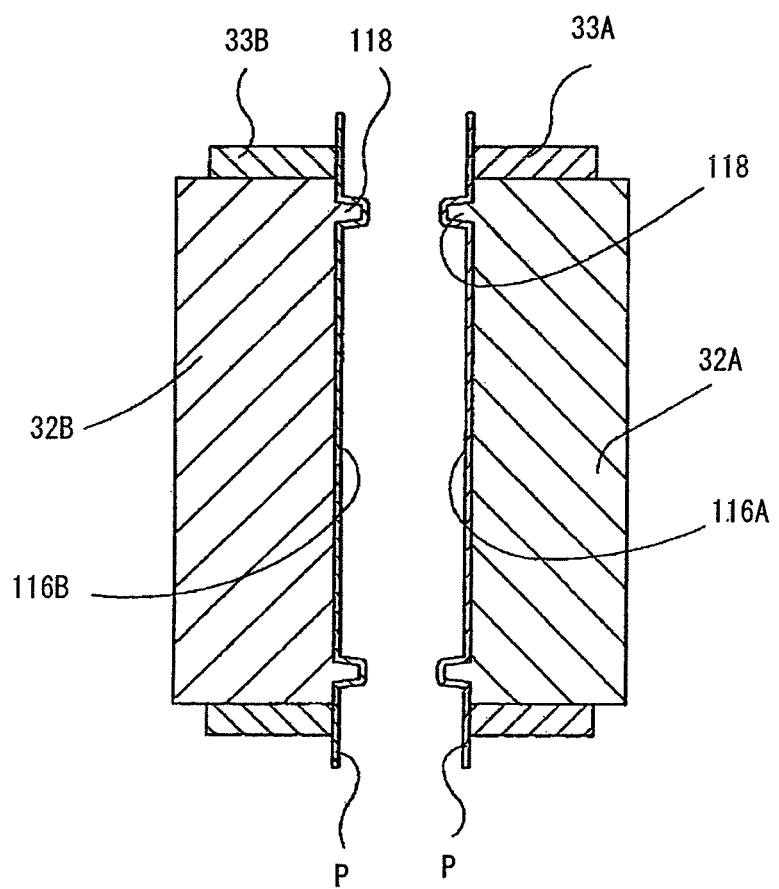
FIG. 3 shows the process wherein, each of the respective thermoplastic foamed resin sheets P obtained through the process shown in FIG. 2 is adsorbed onto the cavity surfaces of the split mold blocks by a vacuum.
Figure 4:
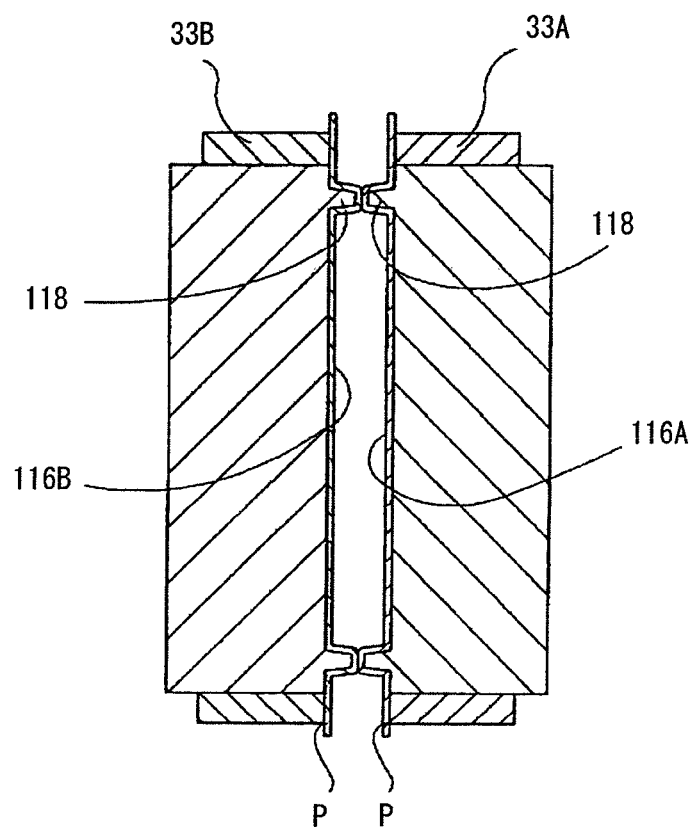
FIG. 4 shows the molding process wherein, the molded products of the climate control duct are molded by closing the split mold blocks, after the process shown in FIG. 3.

Next, as shown in FIG. 3, the thermoplastic resin sheet P is adsorbed onto the surface of a cavity 116A (116B) of the split mold block 32A (32B). Then, as shown in FIG. 4, the split mold block 32A and the split mold block 32B are closed together. Consequently, a duct is formed.

In the duct molding method in the present embodiment, a duct is formed by placing the molten thermoplastic resin sheet P between the split mold blocks 32A and 32B, and closing the split mold blocks 32A and 32B. This can increase adhesion of the thermoplastic resin sheet P. The duct molding method in the present embodiment is explained in detail below with reference to the attached drawings. Furthermore, in the following embodiment, the molding method of a climate control duct 18, which is an example of this duct, is used as an example for this explanation.

<Example of Molding Method of Climate Control Duct 18>

Figure 5:
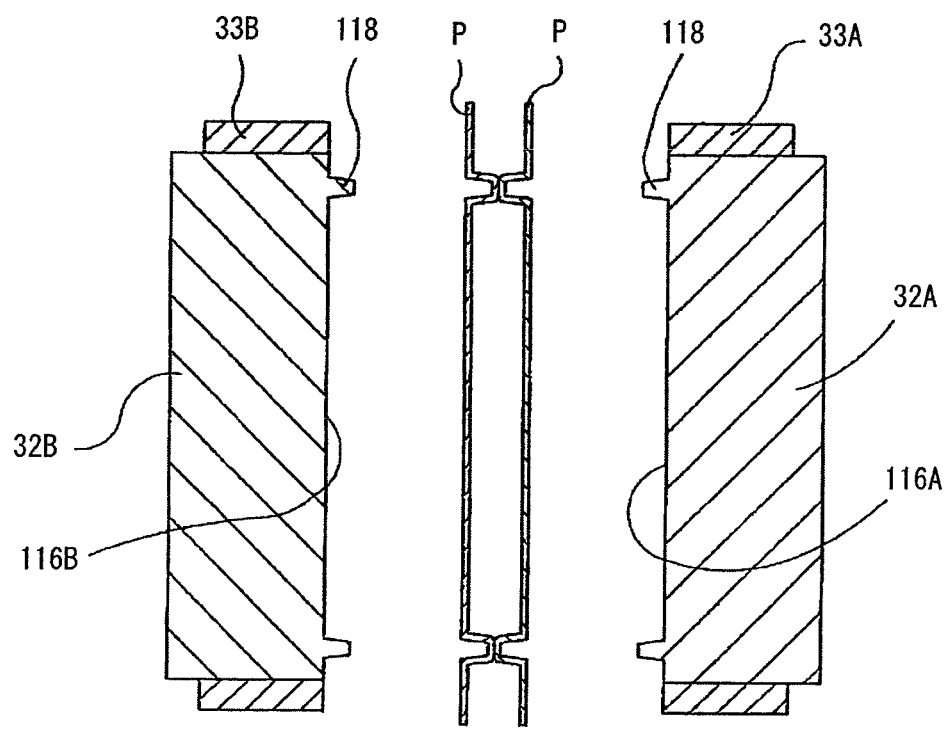
FIG. 5 shows the process of removing molded objects of the climate control duct, by opening the split mold blocks, following the process shown in FIG. 4.
Figure 6:
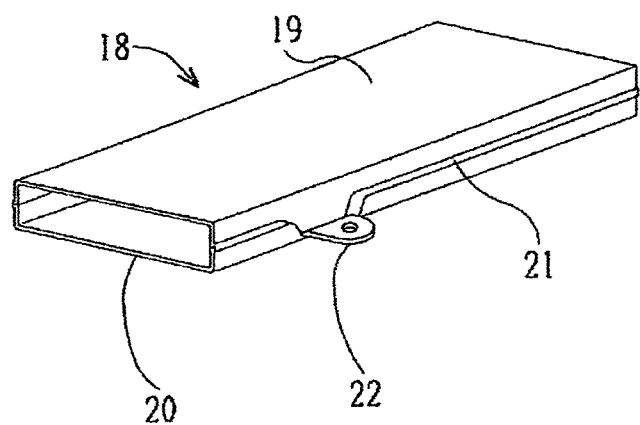
FIG. 6 is a perspective illustration of a climate control duct molded using the molding apparatus shown in FIG. 1.
Figure 7:
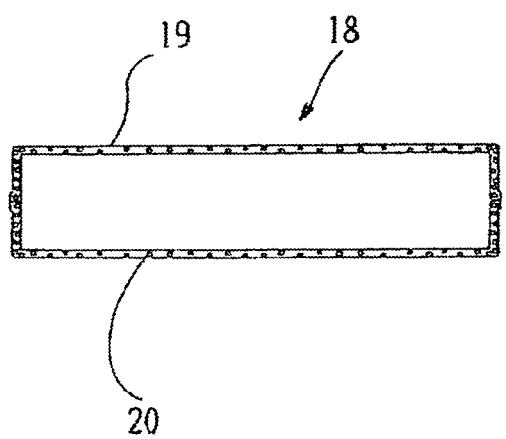
FIG. 7 is an enlarged cross-sectional view of the climate control duct shown in FIG. 6.

First, with reference to FIGS. 1 through 5, an example of a molding method of a climate control duct 18 as shown in FIGS. 6 and 7 is explained. FIG. 1 is a configuration example of the molding apparatus 1 that molds the climate control duct 18 as shown in FIGS. 6 and 7. FIGS. 2 through 5 illustrate the molding processes of the climate control duct 18.

The climate control duct 18, as shown in FIGS. 6 and 7, is a lightweight climate control duct used for ventilation of climate controlled air, supplied by an air conditioning unit, to a desired location. The climate control duct 18 of this present embodiment has foamed wall surfaces (a first wall 19 and a second wall 20, in the same manner below). These wall surfaces have closed air cell structures (closed air cell ratios of 70% or more), which contain a plurality of air cells (having an expansion ratio of 2.0 times or more). Moreover, the climate control duct 18 includes a parting line 21 and a fitting piece 22. The climate control duct 18 of this present embodiment is attached to other parts with the fitting piece 22.

The average wall thickness of the walls 19 and 20 of the climate control duct 18 in the present embodiment is 3.5 mm or less. The average diameter of the air cells of the walls 19 and 20, in thickness direction, is less than 300 μm, preferably less than 100 μm.

The material of the climate control duct 18 in this present embodiment may be a polypropylene type resin. Preferably, this material should be a blended resin of polyethylene type resin and polypropylene type resin. The preferred tensile fracturing elongation of the material for the climate control duct 18 should be 40% or more at −10° C. Moreover, a tensile elasticity of 1000 kg/cm$^3$ or more at room temperature is preferred for this material. In addition to this, the tensile fracturing elongation of this material is preferably 100% or more at −10° C. The measuring methods of the material characteristics and the definitions of the expansion ratio are shown below.

Tensile fracturing elongation: The walls 19 and 20 of the climate control duct 18 obtained from the molding method of the present embodiment were cut and stored at −10° C. After this, from this cut portion, specimen No. 2 was shaped in accordance with JIS K-7113 (ISO 527). The tensile fracturing elongation of this specimen was measured by applying tension at a rate of 50 mm/minute.

Tensile elasticity: The walls 19 and 20 of the climate control duct 18 obtained from the molding method of the present embodiment were cut. Using this cut portion, specimen No. 2 was shaped in accordance with JIS K-7113 in room temperature (23° C.). The tensile elasticity of this specimen was measured by applying tension at a rate of 50 min/minute.

Expansion ratio: Expansion ratios were determined by dividing the density of the thermoplastic resin used in the molding method of the present embodiment by the apparent density of walls 19 and 20 of the climate control duct 18 obtained from the molding method of the present embodiment.

Melt flow rate (MFR): Measured with testing temperatures at 230° C., and a test load of 2.16 kg, in accordance with JIS K-7210 (ISO 1133).

Izod impact strength: The walls 19 and 20 of the climate control duct 18 obtained from the molding method of the present embodiment were cut and stored at −20° C. After this, several small pieces measuring 80×10 (length×breadth in mm) were cut. These sheets were layered to form a 4 mm thickness, and used as a specimen. This specimen was used for measurement, in accordance with JIS K-7110(ISO 180) (notched).

<A Configuration Example of Molding Apparatus 1>

First, with reference to FIG. 1, a configuration example of the molding apparatus 1 for molding the climate control duct 18 in the present embodiment is explained.

The molding apparatus 1 as shown in FIG. 1 has an extruding machine 12 and a clamping machine 10. Two molten thermoplastic foamed resin sheets P are extruded from the extruding machine 12 to the clamping machine 10. In the clamping machine 10, the two molten thermoplastic foamed resin sheets P are placed between a pair of split mold blocks. The two sheets adhere on the inner surfaces (surfaces of the cavity) of the split mold blocks by the closing of these molds. Through this, the climate control duct 18, as shown in FIGS. 6 and 7, is formed.

The extruding machine 12 includes: a first accumulator 22A, a second accumulator 22B, a first plunger 24A, a second plunger 24B, a first T-Die 28A, a second T-Die 28B, a first cylinder 18A, a second cylinder 18B, a first thermoplastic resin supply hopper 16A, a second thermoplastic resin supply hopper 16B, a first pair of rollers 30AA and 30AB, a second pair of rollers 30BA and 30BB, a first electric motor 20A, and a second electric motor 20B.

The clamping machine 10 includes the split mold blocks 32A and 32B, and the frames 33A and 33B. The frame 33A (33B) is positioned at the perimeter of the split mold block 32A (32B). The split mold block 32A (32B) contains a cavity surface 116A (116B) and a pinch-off molding part 118. The gap between the split mold block 32A (32B) and the frame 33A (33B) should preferably be 0.1 mm or more and less than 1.0 mm, more preferably 0.1 mm or more and less than 0.5 mm. Setting such gaps can prevent the clogging of resins in the gap between the split mold block 32A (32B) and the frame 33A (33B), as well as hindrance in the function of the split mold block 32A (32B) and the frame 33A (33B) in cases of thermal expansion.

<Molding Process Example of Climate Control Duct 18>

Next, the molding process example of the climate control duct 18 is explained, with reference to FIGS. 1 through 5.

First, as shown in FIG. 1, two thermoplastic foamed resin sheets P (molten thermoplastic foamed resin sheets containing air cells) are extruded from the first T-Die 28A and the second T-Die 28B, in order to form the first wall 19 and the second wall 20. The two thermoplastic foamed resin sheets P are suspended between the pair of the split mold block 32A and the split mold block 32B.

Next, the frame 33A (33B) and the split mold block 32A (32B) are moved forward horizontally. Due to this, as shown in FIG. 2, the frame 33A (33B) located at the perimeter of the pair of the split mold block 32A (32B) come into contact with thermoplastic foamed resin sheets P. Then, the thermoplastic foamed resin sheets P are sucked in by a suction part (not illustrated) built into the frame 33A (33B). This allows the sheets P to be retained on the frame 33A (33B). Also, this can allow shaping of a closed space between the thermoplastic foamed resin sheets P and the cavity surface 116A (116B) of the split mold block 32A (32B).

Next, while the thermoplastic foamed resin sheets P are retained on the frame 33A (33B), the split mold block 32A (32B) is moved forward horizontally. Moreover, as shown in FIG. 3, the thermoplastic foamed resin sheets P are vacuum-adsorbed onto the cavity surface 116A (116B) of the split mold block 32A (32B). This shapes the thermoplastic foamed resin sheets P according to the cavity surface 116A (116B).

Next, the frame 33A (33B) and the split mold block 32A (32B) are moved forward horizontally. By this, as shown in FIG. 4, the frame 33A and the split mold block 32A, and the frame 33B and the split mold block 32B are closed together. Due to this, the pinch-off molding parts 118 of the pair of split mold blocks 32A and 32B come into contact with each other. Consequently, the two thermoplastic foamed resin sheets P bond and thermally fuse, forming a parting line along the bonding surface of the two thermoplastic foamed resin sheets P. In this way, the molded product of the climate control duct 18 is formed.

Furthermore, after closing the split mold blocks 32A and 32B, air may be blown between the sheets P. The blow of air, for example, can be applied with a pressure between 1 and 3 kgf/cm$^2$. This allows greater accuracy in shaping the duct to correspond to the shape of the mold.

Next, the molded product of the climate control duct 18 is cooled within the pair of split mold blocks 32A and 32B.

Next, the frame 33A and the split mold block 32A, and the frame 33B and the split mold block 32B are moved backward horizontally. Due to this, as shown in FIG. 5, the frame 33A and the split mold block 32A, and the frame 33B and the split mold block 32B, are separated from the molded product of the climate control duct 18.

Next, the burrs along the perimeter of the parting line, formed by the pinch-off molding part 118, are removed. The result is the climate control duct 18, as shown in FIGS. 6 and 7.

Furthermore, the thickness, extrusion speed, and wall thickness distribution of extrusion directions of the two thermoplastic foamed resin sheets P hung between the pair of split mold blocks 32A and 32B, are adjusted individually to prevent variances of the wall thickness that occur due to draw-down and necking-in.

Each expanded thermoplastic foamed resin sheet P is formed as follows. The thermoplastic foamed resin with an added foaming agent is melted and mixed by the first cylinder 18A and the second cylinder 18B. Next, the thermoplastic foamed resin sheet is temporarily stored in an accumulation chamber of the first accumulator 22A, and an accumulation chamber of the second accumulator 22B. This thermoplastic foamed resin is supplied to the first T-Die 28A by the first plunger 24A and to the second T-Die 28B by the second plunger 24B, at a fixed interval. In addition to this, it is also possible to mix into the thermoplastic foamed resin, for example, a foam nucleating agent or a coloring pigment (carbon black), to act as the foaming source in the first cylinder 18A and the second cylinder 18B.

The thermoplastic foamed resin sheets P extruded from the first T-Die 28A and the second T-Die 28B are compressed respectively, by the first pair of rollers 30AA and 30AB, and the second pair of rollers 30BB and 30BA. With these rollers, the thermoplastic foamed resin sheets P are placed between the pair of the split mold block 32A and the split mold block 32B. During this procedure, the thickness and the wall thickness distribution of each thermoplastic foamed resin sheet P are individually adjusted.

To be specific, first, the extrusion speed of each thermoplastic foamed resin sheet P is set individually, by the first accumulator 22A and the second accumulator 22B, and the first T-Die 28A and the second T-Die 28B.

It is possible to appropriately select, the extrusion capacity of the first cylinder 18A and the second cylinder 18B connected respectively to the first accumulator 22A and the second accumulator 22B, according to the size of the climate control duct 18 to be finally molded. However, an extrusion capacity of 50 kg/hour or more is preferred for the first cylinder 18A and the second cylinder 18B. This makes it possible to shorten the molding cycle of the climate control duct 18.

Also, for preventing draw-down, extrusion of the thermoplastic foamed resin sheets P from the first T-Die 28A and the second T-Die 28B needs to be completed in 40 seconds or less, preferably in 30 seconds or less.

For this reason, the thermoplastic foamed resin, retained in the accumulation chamber of the first accumulator 22A and the accumulation chamber of the second accumulator 22B, should be extruded through the slit opening of the first T-Die 28A and the second T-Die 28B at 50 kg/hour or more per 1 cm$^2$, preferably at 60 kg/hour or more. During this, drawdown can be kept minimal by changing the slit gaps of the first T-Die 28A and the second T-Die 28B along with the extrusion of the thermoplastic foamed resin sheets P.

In short, the thickness of the upper wall of the thermoplastic foamed resin sheets P tends to be thinner, as it becomes stretched by its own weight due to the draw-down effect. On the other hand, the slit openings of the first T-Die 28A and the second T-Die 28B corresponding to the upper part of thermoplastic foamed resin sheets P, can be gradually widened as extrusion of the resin sheet P takes place. By doing this, the wall thickness of thermoplastic foamed resin sheets P can be adjusted to be uniform from top to bottom.

Additionally, it is also possible to differentiate the extrusion speed of the thermoplastic foamed resin sheets P being extruded from the first T-Die 28A and the second T-Die 28B, and the rotation speed of the first pair of rollers 30AA and 30AB, and the second pair of rollers 30BB and 30BA. This then allows a difference to be set between the extrusion speed of the thermoplastic foamed resin sheets P from the first T-Die 28A and the second T-Die 28B, and the feeding rate of the thermoplastic foamed resin sheets P from the first pair of rollers 30AA and 30AB, and the second pair of rollers 30BB and 30BA. Consequently, the thermoplastic foamed resin sheets P can be expanded between the first T-Die 28A and the second T-Die 28B, and the first pair of rollers 30AA and 30AB and the second pair of rollers 30BB and 30BA. As a result, thickness of the resin sheets P can be adjusted to be smaller.

Each thermoplastic foamed resin supplied to the first T-Die 28A and the second T-Die 28B is extruded from the slit of the T-Die body as the thermoplastic foamed resin sheets P, after passing through resin ducts starting from the manifold of each T-Die body (not illustrated). The T-Die body is made by overlapping a die upon another die. In the tip of the T-Die body, one die lip and another die lip face each other with a gap therebetween. This slit gap is set by using a slit gap adjustment device 23.

The thicknesses of the resin sheets P extruded from the first T-Die 28A and the second T-Die 28B are determined by the slit gap. Specifically, the thickness of each thermoplastic foamed resin sheet P extruded from the first T-Die 28A and the second T-Die 28B is 0.6 to 6.0 mm.

Moreover, the slit gap is adjusted by a known slit gap adjustment device 23. Uniformity in the width direction of the resin sheets P is adjusted by making adjustments on the slit gap. In addition to this, another die lip is altered by the slit gap adjustment device 23, during intermittent extrusion of the resin sheet P from beginning to end. Due to this, the thicknesses in the extruding direction of the resin sheets P are adjusted.

A thermal expansion device and a mechanical device are available for the slit gap adjustment device 23. It is preferable to use the slit gap adjustment device 23 equipped with both functions.

A plurality of slit gap adjustment devices 23 are placed at equal intervals along the width of the slit. The thickness of the resin sheet P can be made uniform along the entire width, by the narrowing or widening of corresponding slit gaps with each slit gap adjustment device 23.

The slit gap adjustment device 23 includes a die bolt set to freely move toward or away from a die lip. An adjustment shaft is placed, through the pressure transmission part, at the tip of the die bolt. On the adjustment shaft, clutch pieces are fastened with tie bolts. The clutch pieces are linked to one die lip. As the die bolt moves forward, the adjustment shaft is pushed toward the tip through the pressure transmission part. Consequently, the die lip is pressed. Subsequently, the die lip is deformed by the sections grooved in. For this reason, the slit gaps become narrow. On the contrary, in order to widen the slit gap, the die bolt is slid backward.

Additionally, the slit gap can be adjusted more precisely by implementing a thermal expansion adjustment device, in addition to the above mentioned mechanical adjustment device. More specifically, the die lip is pressed due to the thermal expansion of the adjustment shaft being heated by an electric heater, not shown. This causes narrowing of the slit gap.

Moreover, to widen the slit gap, the electric heater is stopped, and the adjustment shaft is cooled by cooling procedures not illustrated. This causes the adjustment shaft to shrink, making the slit gap wider.

At the time when the resin sheet P extruded from the first T-Die 28A and the second T-Die 28B is suspended between the pair of the split mold block 32A and the split mold block 32B, or when the split mold block 32A and the split mold block 32B are closed, it is preferable that the thickness in the extruding direction of the resin sheet P be adjusted to be uniform. In such a case, the slit gap widens gradually as extrusion of the resin sheet P takes place, and reaches its maximum when extrusion of the resin sheet P ends.

Consequently, the thickness of the resin sheets P extruded from the first T-Die 28A and the second T-Die 28B gradually becomes thicker after the extrusion of the resin sheets P begin. However, as the resin sheet P extruded in the molten state stretches due to its own weight (draw-down effect), thickness of the resin sheet P tends to gradually become thinner toward the upper section. Therefore, the thickness gained by widened slit gaps, and the thinner area due to the draw-down effect, balance each other out. This allows the thickness of the resin sheet P to be adjusted uniformly from top to bottom.

As mentioned above, if the pressure (injection pressure) when extruding the resin sheet P from the T-Die, the extrusion speed (injection speed) of the resin, the roller rotation speed, and the slit gap of the T-Die, are constant during injection, the extruded resin sheet P will experience drawdown (necking) due to its own weight. Hence, as lower sections of the resin sheet P become thicker, upper sections on the other hand tend to become thinner. Therefore, the thickness of the resin sheet P can be adjusted by multiple-stage settings of injection pressure, injection speed, and roller feeding speed, during injection. More specifically, upper sections of the resin sheet P being thinner can be controlled by gradually raising the injection pressure and injection speed during injection. Also, the necking of the resin sheet P due to its own weight can be controlled by increasing the rotation speed (feeding speed) of the roller during injection.

These parameters (injection pressure, injection speed, roller rotation speed) are relatively easy to adjust by controlling the cylinder and the accumulator with a program. Therefore, these parameters are suitable for adjusting the wall thickness of the resin sheet P.

Moreover, when the material of the resin sheet P is a resin with high membrane forming properties (for example, a resin in which inorganic filler such as talc is added to a polypropylene type resin), uniform thickness of the resin sheet P can be obtained without making major adjustments to injection pressure, injection speed, and roller rotation speed, during injection.

Figure 8:
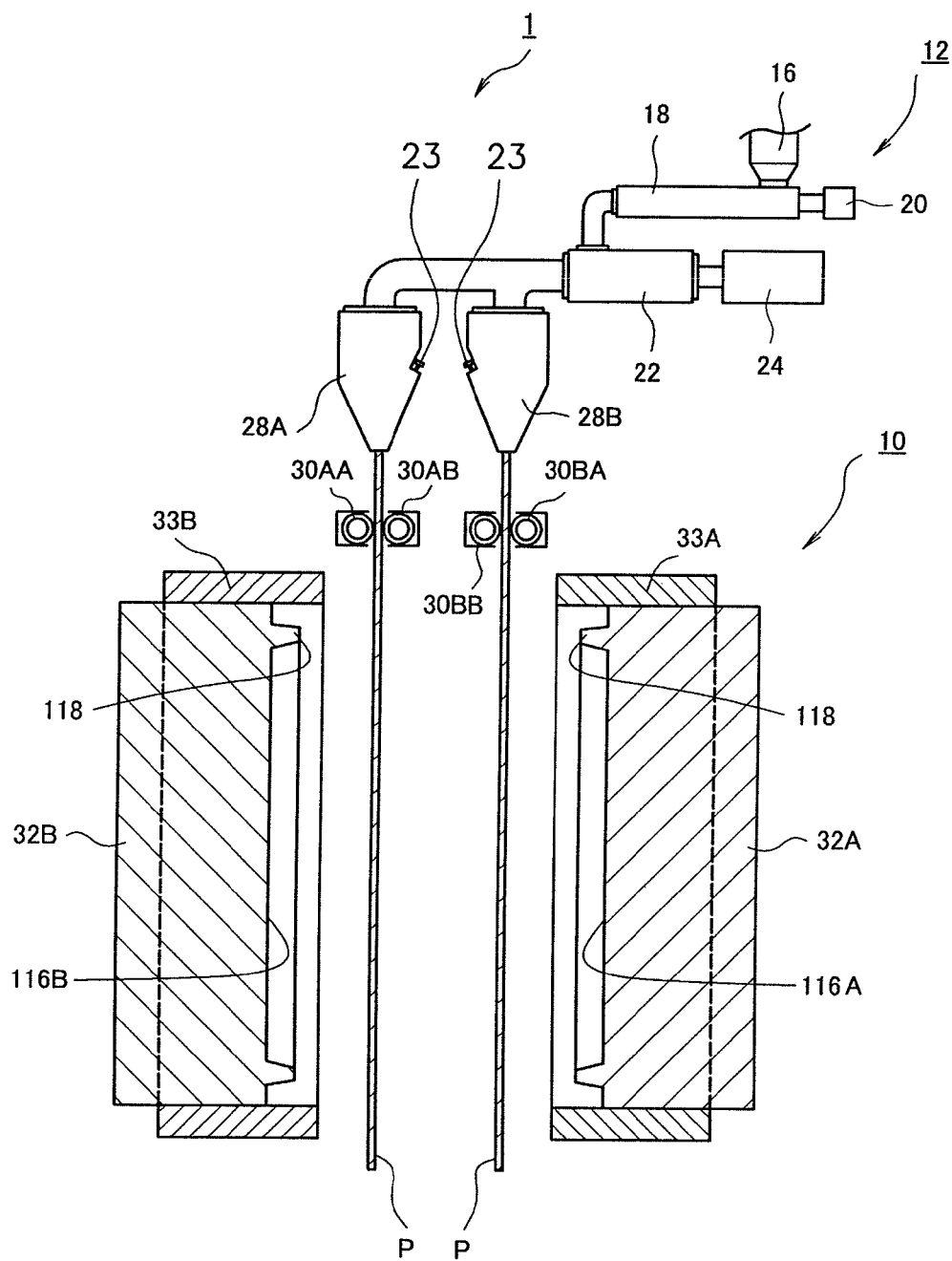
FIG. 8 is a diagram that illustrates another configuration example of a molding apparatus implementing the method of molding a climate control duct according to the present embodiment.

Moreover, in the molding apparatus 1 illustrated in FIG. 1 mentioned above, supply ducts of the thermoplastic foamed resin for the first T-Die 28A and the second T-Die 28B are independent. However, as shown in FIG. 8, it is also possible to connect a single cylinder 18 and a single accumulator 22 connected to the cylinder 18, to the first T-Die 28A and the second T-Die 28B. In such a case, branching at the tip of the accumulator 22 will allow supply of thermoplastic foamed resin into the first T-Die 28A and the second T-Die 28B. In addition to this, an accumulator using the side-accumulation method or ring-accumulation method can be used as the accumulator 22.

Figure 9:
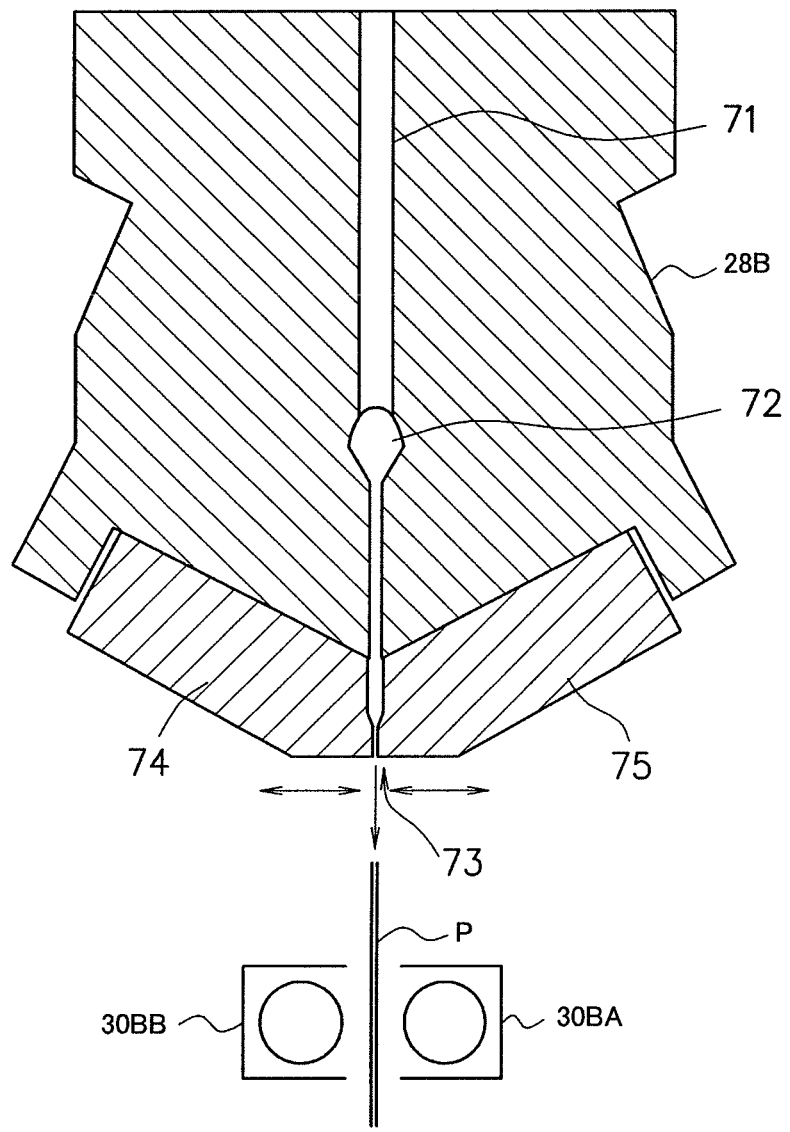
FIG. 9 shows a structural example of the T-Die, constituting the molding apparatus, and is a diagram that shows a structural example of a single-manifold system.

Moreover, the structure illustrated in FIG. 9 is also acceptable for the first T-Die 28A and the second T-Die 28B, as illustrated in FIG. 1 or FIG. 8. For example, when the second T-Die 28B is of the structure illustrated in FIG. 9, the thermoplastic foamed resin supplied from the second accumulator 22B is introduced and guided to a duct 71, and widens in the direction of the die width while flowing in a manifold 72. Next, the thermoplastic foamed resin heads toward a slit 73, through the downstream resin duct of the manifold 72. Consequently, the thermoplastic foamed resin sheet P is suspended, between the pair of the split mold block 32A and the split mold block 32B, from the slit 73.

Moreover, the structure illustrated in FIG. 9 has gating mechanisms 74 and 75 to control the gating of the slit 73. Sliding the gating mechanisms 74 and 75 sideways will open or close the slit 73. Normally, closing of the outlet of the accumulation chamber of the accumulator 22A (22B) allows storing of the molten resin in the concerned accumulation chamber. Due to this, resin pressure in the accumulation chamber can be increased. On the other hand, in the structure illustrated in FIG. 9, while increasing resin pressure, the tip of the T-Die is closed with a connected state of the accumulation chamber and the duct within the T-Die. This allows the pressure of the resin stored in the accumulation chamber and the duct within the T-Die to be increased. In other words, pressure of the molten resin up to the outlet of the T-Die 28A (28B) can be increased by closing the slit 73 using the gating mechanisms 74 and 75. Next, when the internal pressure of the T-Die 28A (28B) increases to a specific value, the slit 73 is opened with the gating mechanisms 74 and 75. Due to this, the thermoplastic foamed resin sheet P is suspended from the slit 73, between the pair of the split mold block 32A and the split mold block 32B. In this way, the internal pressure within the T-Die 28A (28B) can be increased in this structure. Therefore, expansion of the thermoplastic foamed resin sheet P can be prevented until the thermoplastic foamed resin sheet P is extruded from the T-Die 28A (28B). The thermoplastic foamed resin sheet P can expand once the thermoplastic foamed resin sheet P is extruded from the T-Die 28A (28B). Additionally, as long as the gating of the slit 73 is possible, any configuration or control method is acceptable for the configuration and control method of the gating mechanisms 74 and 75. Also, a choke bar (not illustrated) may also be mounted downstream in the resin duct of the manifold 72. In this structure, the flow rate and thickness of the thermoplastic foamed resin in its width direction can be adjusted by the choke bar.

Figure 10:
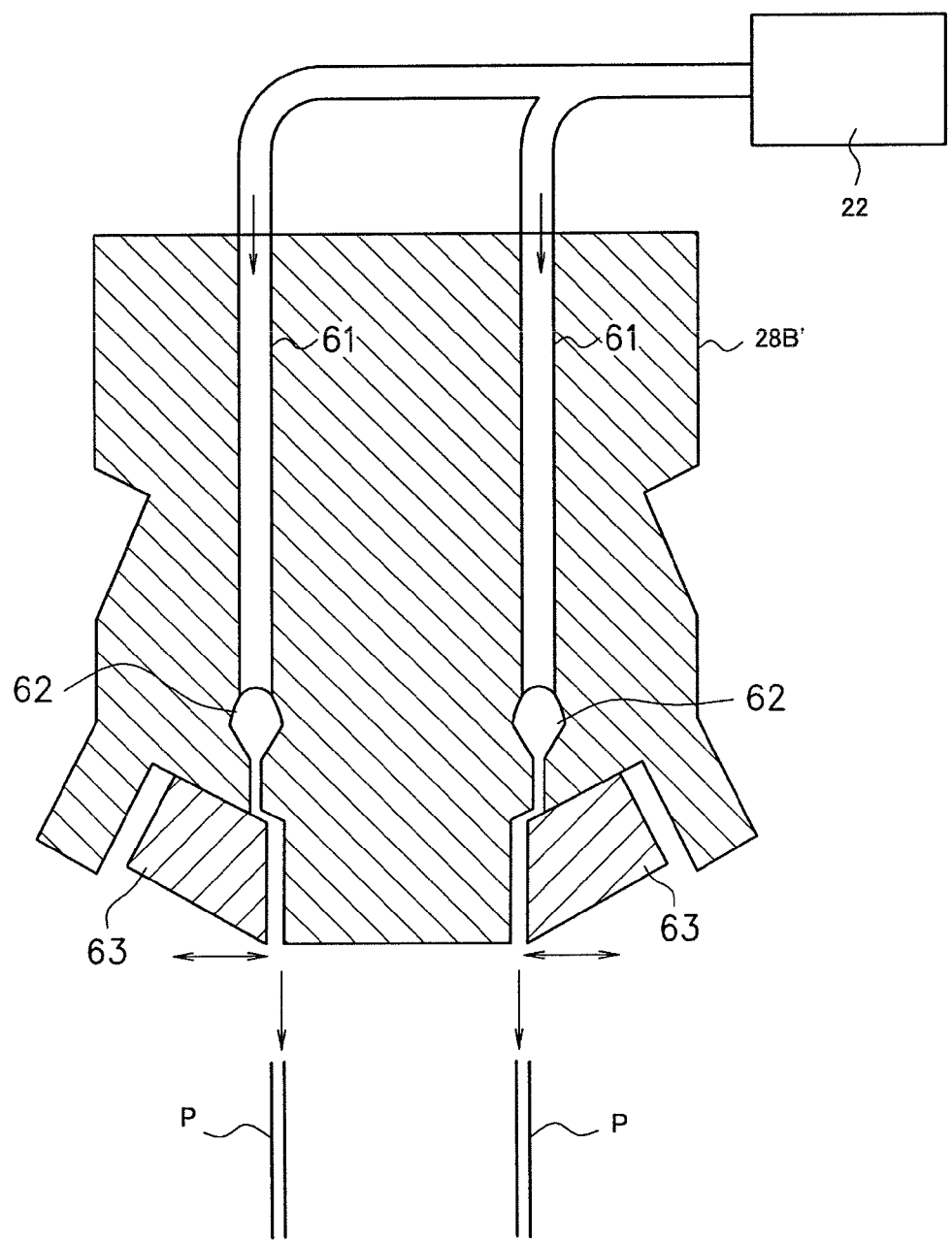
FIG. 10 shows a structural example of the T-Die, constituting the molding apparatus, and is a diagram that shows a structural example of a multi-manifold system.

Moreover, the two thermoplastic foamed resin sheets P are suspended between the pair of the split mold blocks 32A and 32B in the molding apparatus 1 illustrated in FIG. 1 or FIG. 8, with the two T-Dies 28A and 28B using the single manifold method. However, it is also possible to suspend the two thermoplastic foamed resin sheets P between the pair of the split mold block 32A and the split mold block 32B using a single T-Die 28B' using the multiple manifold method illustrated in FIG. 10. In the T-Die 28B' illustrated in FIG. 10, the thermoplastic foamed resin supplied from the accumulator 22 is introduced and guided into the two ducts 61 and 61. The thermoplastic foamed resin flows through each manifold 62 and 62, and spreads along the width of the die. Choke bars 63 and 63 are set downstream in the manifolds 62 and 62. The flow rate in width and the thickness of the thermoplastic foamed resin can be adjusted with this choke bar 63. This enables two thermoplastic foamed resin sheets P to be suspended between the pair of the split mold block 32A and the split mold block 32B, from the T-Die 28B' illustrated in FIG. 10. Moreover, the internal pressure of the T-Die 28B' can be increased by closing the resin duct using the choke bars 63 and 63. Since this allows an increase in internal pressure of the T-Die 28B', the expansion of the thermoplastic foamed resin sheet P can be prevented until the thermoplastic foamed resin sheet P is extruded from the T-Die 28B'. The thermoplastic foamed resin sheet P can expand, once the thermoplastic foamed resin sheet P is extruded from the T-Die 28B'.

Moreover, in the molding apparatus 1 illustrated in FIG. 1 or FIG. 8, the first pair of rollers 30AA and 30AB, and the second pair of rollers 30BB and 30BA adjust the thickness of the thermoplastic foamed resin sheet P. However, these pairs of rollers are not indispensable.

When the thermoplastic foamed resin sheet P is compressed by the pair of rollers, the air cells in the thermoplastic foamed resin sheet P may burst. Therefore, in a structure without a pair of rollers, since the air cells in the thermoplastic foamed resin sheet P do not burst, the expansion ratio of the thermoplastic foamed resin sheet P can be increased.

The polypropylene type resin, available for use in molding of the climate control duct 18 in the present embodiment, is preferably polypropylene having a melt tension within the range of 30 to 350 mN at 230° C. Especially, the polypropylene type resin preferably is a polypropylene homopolymer having a long chain branching structure, and the one with additives of ethylene-propylene block copolymer is even better.

Moreover, hydrogenated styrene thermoplastic elastomer may also be added to the polypropylene type resin. In such a case, in order to maintain stiffness and improve impact-resistance of the climate control duct 18, styrene thermoplastic elastomer is added to the polypropylene type resin at 5 to 40 wt %, preferably within the range of 15 to 30 wt %.

The styrene thermoplastic elastomer used, specifically, is a hydrogenated polymer of styrene-butadiene-styrene block copolymer, styrene-isoprene-styrene block copolymer, and styrene-butadiene random copolymers. Moreover, when using a hydrogenated styrene thermoplastic elastomer, the styrene content is less than 30 wt %, preferably less than 20 wt %. The MFR (measured under the testing temperature of 230° C., and a testing load of 2.16 kg, in accordance with HS K-7210) of the hydrogenated styrene thermoplastic elastomer at 230° C., is 10 g/10 minutes or less, preferably 5.0 g/10 minutes or less and 1.0 g/10 minutes or more.

Moreover, the polyolefin polymer added to the polypropylene type resin is preferably a low density ethylene-a-olefin, with a preferred compounding ratio within the range of 1 to 20 wt %. The low density ethylene-a-olefin preferably should have a density of 0.91 g/cm$^3$ or less. A suitable low density ethylene-a-olefin is the ethylene-α-olefin copolymer obtained by copolymerizing α-olefin having 3 to 20 carbon atoms, with ethylene. Some examples are propylene, 1-butane, 1-pentene, 1-hexene, 1-heptene, 1-octene, 1-nonene, 1-decene, 1-dodecene, 4-methyl-1-pentene, 4-methyl-1-hexene, and 1-butane, 1-hexane, and 1-octene are preferred. Moreover, α-olefin with 3 to 20 carbon atoms as mentioned above can be used independently, and also in combinations of two or more types. The content of the monomer unit based on ethylene of the ethylene-α-olefin copolymer, in relation to the ethylene-a-olefin copolymer, is within the range of 50 to 99 wt %. Moreover, the content of the monomer unit based on α-olefin is in the range of 1 to 50 wt %, in relation to the ethylene-a-olefin copolymer. Specifically, use of linear very-low density polyethylene, ethylene elastomer, or propylene elastomer, polymerized using a metallocene catalyst, is preferred.

The material of the thermoplastic foamed resin sheet P, suspended between the pair of the split mold block 32A and the split mold block 32B, needs to have a high melting tension. Not only does this prevent variances in the wall thickness of the resin sheet P caused by draw-down or necking-in, but can also increase the expansion ratio. For this reason, the climate control duct 18 is produced with excellent lightweight and insulation properties.

In particular, the MFR of the resin sheet P at 230° C. (measured under the testing temperature of 230° C., and a testing load of 2.16 kg in accordance with JIS K-7210), is preferably 5.0 g/10 minutes or less, more preferably 1.5 to 3.0 g/10 minutes. Now generally, the MFR at 230° C. (measured under the testing temperature of 230° C., and a testing load of 2.16 kg, in accordance with JIS K-7210) of resin materials used in shaping films and the like through extrusion from a T-Die, is greater than 3.0 g/10 minutes, specifically 5.0 to 10.0 g/10 minutes.

Moreover, it is also possible to use a blended resin as the material of the resin sheet P for molding the climate control duct 18 in the present embodiment, where a long chain branch structured polypropylene (mentioned hereafter as long chained PP) and a polyethylene resin containing a high density polyethylene with a long chain branch structure (mentioned hereafter as long chained HDPE) are blended.

Also, the polyethylene resin containing the long chained HDPE may contain only the long chained HDPE, or may also be a blended material of the long chained HDPE with other polyethylene type resins. For example, polyethylene (low density polyethylene, medium density polyethylene or the like) with a density of 0.94 g/cm³ or less, may be blended in the long chained HDPE.

Molding the climate control duct 18 using the above mentioned resin blend, results in a high expansion form of the climate control duct 18.

Moreover, from the perspective of increasing the expansion ratio, it is preferred that the long chained PP be a propylene homopolymer (homo PP) with a weighted average branching index of 0.9 or less. Also, the weighted average branching index is represented by v1/v2 where v1 is the viscosity limit value of the branched polyolefin, and v2 is the viscosity limit value of the linear polyolefin having the same weight-average molecular weight as the branched polyolefin.

Again, from the perspective of increasing the expansion ratio, it is preferred that the long chained HDPE be an ethylene homopolymer (homo PE) with a melt tension (MT) at 230° C. of 30 mN or more.

Moreover, from the perspective of maintaining stiffness while increasing de-burring performance, a high density polyethylene (density of 0.94 g/cm³ or more) of a non-long chained branching structure can be used as the polyethylene other than the long chained HDPE, to be blended in the resin blend. Further, in order to increase impact resistance in low temperatures, a polyethylene with a density of 0.91 g/cm³ or less may also be used. In this case, it is especially preferred that a very-low density linear polyethylene, polymerized by a metallocene catalyst, be used.

Moreover, it is preferred that several resins be blended in the resin blend, to have a melt tension (MT) at 230° C. of 30 to 350 mN. Here, MT refers to the melting tension. If the MT of the resin blend is within the range of 30 to 350 mN, a high expansion ratio can be obtained. In addition to this, MT is the tension measured by using the "melt tension tester" (manufactured by Toyo Seiki Seisaku-sho Ltd). In this measurement, the pre-heating temperature is 230° C. and the extrusion speed is 5.7 mm/minute, and the strand is extruded from an orifice measuring 2.095 mm in diameter and 8 mm in length. This strand is wound at a winding speed of 100 rpm, onto a roller of 50 mm diameter. The MT is measured as the strand tension during this winding.

Moreover, the melt flow rate (MFR) at 230° C. of the resin blend is preferably 1 to 10 g/10 minutes. Here, the MFR refers to the value measured according to JIS K-7210. When compared to when the MFR is within the range of 1 to 10 g/10 minutes, if the MFR is less than 1 g/10 minutes, it tends to become more difficult to increase the extrusion speed. When compared to when the MFR is within the range of 1 to 10 g/10 minutes, if the MFR exceeds 10 g/10 minutes, molding tends to be more difficult due to draw-down occurring.

Moreover, the expansion ratio can be increased by shaping a foamed molding using a resin blend containing 5 to 40 wt % of thermoplastic elastomer. In this case, for example, styrene elastomer, ethylene propylene rubber (mentioned hereafter as EPR), and olefin block copolymer (mentioned hereafter as OBC) can be used as the thermoplastic elastomer.

As a styrene elastomer, it is possible to use an elastomer having a styrene unit with hydrogen added within molecules. For example, it is possible to use hydrogenated elastomers such as styrene-ethylene-butylene-styrene block copolymer (mentioned hereafter as SEBS), styrene-ethylene-propylene-styrene block copolymer, and styrene-butadiene random copolymers.

Moreover, by molding the climate control duct 18 using a resin blend containing 5 to 20 wt % of OBC (olefin block polymer), the expansion ratio can be increased approximately 4.0 times or more. Note that the OBC is a product in which the two types of polyolefins are alternately shaped into blocks within a single molecule, through a catalyst system involving two types of catalysts.

As a foaming agent, inorganic physical foaming agents such as air, carbon dioxide, nitrogen gas, and water, and organic physical foaming agents such as butane, pentane, hexane, dichloromethane, and dichloroethane, chemical foaming agents such as sodium bicarbonate, citric acid, sodium citrate, and azodicarbonamide (mentioned hereafter as ADCA), or in addition to this, a combination of these physical foaming agents and chemical foaming agents, can be used as the foaming agent.

Especially, using a chemical foaming agent that produces a carbon dioxide gas, such as carbon dioxide, sodium bicarbonate, citric acid, or sodium citrate as a foaming agent, can control shark-skin from occurring. This then creates a clean surface on the foamed molding. Here, shark-skin refers to the irregularities on the surface of the molded product due to the uneven flow of the molten resin from the die slits.

Moreover, the chemical foaming agent plays a core role in the foaming of the physical foaming agent, when a combination of carbon dioxide as a physical foaming agent, and a chemical foaming agent generating carbon dioxide, is used. This enables fine dispersion of air cells. Thus, the strength of the foamed molding can be increased, while improving de-burring performance.

Moreover, when mixing a physical foaming agent into the resin blend, it is preferable to mix the physical foaming agent as a supercritical fluid into the resin blend. Especially, it is preferable to mix carbon dioxide or nitrogen gas in its supercritical state, into the resin blend. In this case, uniform and assured foaming is obtained. Moreover, for nitrogen, the supercritical fluid state of nitrogen can be obtained by setting the critical temperature at −149.1° C., and critical pressure of 3.4 MPa or more. The supercritical fluid state of carbon dioxide is obtained by a critical temperature of 31° C., and critical pressure of 7.4 MPa or more.

<Operation/Effect of Molding Method of Climate Control Duct 18 in the Present Embodiment>

In this way, in the molding method of the climate control duct 18 in the present embodiment, the thermoplastic foamed resin with a mixture of the foaming agent supplied from the cylinder 18A (18B) shown in FIG. 1 is stored in the accumulator 22A (22B). This thermoplastic foamed resin is supplied at regular intervals to the T-Die 28A (28B) using a plunger 24A (24B). From the T-Dies 28A and 28B, a pair of molten thermoplastic foamed resin sheets P is extruded in a molten state and having air cells. This pair of thermoplastic foamed resin sheets P is placed between the pair of the split mold blocks 32A and 32B. Further, as shown in FIG. 2, the frame 33A (33B) located along the perimeter of the split mold block 32A (32B) is moved closer to the thermoplastic foamed resin sheets P. Then, with the suction parts set inside the frame 33A (33B), the thermoplastic foamed resin sheets P are sucked. This then causes the thermoplastic foamed resin sheets P to adhere to the frame 33A (33B). Next, as shown in FIG. 3, the thermoplastic foamed resin sheets P are adsorbed by a vacuum onto the cavity surfaces 116A and 116B of the pair of the split mold blocks 32A and 32B. Then, as shown in FIG. 4, the split mold block 32A and the split mold block 32B are closed shut. The climate control duct 18 is molded in this manner. Following this, as shown in FIG. 5, after the pair of split mold blocks 32A and 32B is separated from the climate control duct 18, the climate control duct 18 is taken out.

In this way, in this duct molding method in the present embodiment, a molten pair of the thermoplastic foamed resin sheets P is placed between the pair of split mold blocks 32A and 32B. After this, the split mold blocks 32A and 32B are closed to form a duct. As a result of this, adhesion of the two thermoplastic foamed resin sheets P can be improved.

EXAMPLE

Next, specific examples, related to an example of the molding method of the climate control duct 18 mentioned above are explained. However, the following Examples are only some examples, and the technical concepts of the present embodiment are not limited to these following examples.

FIG. 11 shows (1) the material compound ratio of the resin blend, and (2) the expansion ratio of the molded foaming ducts, regarding Examples 1 through 5.

The resins A to C shown in FIG. 11 and the following Examples correspond to the following resins.

Resin A: Long chained HDPE (homopolymer), "08S55A" made by Tosoh Corporation

Resin B: Long chained PP (homopolymer), "WB140" made by Borealis Inc.

Resin C: OBC, "OBC9000" made by the Dow Chemical Company

Example 1

A foamed resin was made by taking carbonic acid gas in its supercritical state as the foaming agent, talc master batch (1.5 parts by weight) as the nucleating agent, and carbon black master batch (1.5 parts by weight) as the coloring agent, and adding them to the resin blend (100 parts by weight) obtained by mixing Resin A and Resin B at a ratio of 50:50. This was extruded between the split mold block 32A and the split mold block 32B as two thermoplastic foamed resin sheets P. The split mold block 32A and the split mold block 32B were closed, bonding and thermally fusing the two thermoplastic foamed resin sheets P. This forms the molding of the climate control duct 18. As shown in FIG. 11, the expansion ratio of the molded climate control duct 18 was 2.9 times.

Example 2

The procedures in Example 2 were the same as the procedures in Example 1, except that the resin blend used was obtained by mixing Resin A, Resin B, and Resin C in a ratio of 50:45:5. As shown in FIG. 11, the expansion ratio of the molded foamed duct was 4.2 times.

Example 3

The procedures in Example 3 were the same as the procedures in Example 1, except that the resin blend used was obtained by mixing Resin A, Resin B, and Resin C in a ratio of 50:40:10. As shown in FIG. 11, the expansion ratio of the molded foamed duct was 4.7 times.

Example 4

The procedures in Example 4 were the same as the procedures in Example 1, except that the resin blend used was obtained by mixing Resin A, Resin B, and Resin C in a ratio of 50:30:20. As shown in FIG. 11, the expansion ratio of the molded foamed duct was 4.0 times.

Example 5

The procedures in Example 5 were the same as the procedures in Example 1, except that the resin blend used was obtained by mixing Resin A, Resin B, and Resin C in a ratio of 50:10:40. As shown in FIG. 11, the expansion ratio of the molded foamed duct was 3.7 times.

Example 1 is a foamed resin blend with a polyethylene type resin including high density polyethylene (Resin A) of long chained branching structures at 50 wt %, and polypropylene (Resin B) of long chained branching structures at 50 wt %. The expansion ratio of such foamed resin blend will be higher than that of a resin blend in which only polypropylene (Resin B) with long chained branching structures is foamed.

Moreover, according to Examples 2 through 5, blending of the OBC as a thermoplastic elastomer at 5 to 40 wt % can cause improvements in the expansion ratio, when compared to the blending of other thermoplastic elastomers.

Especially, according to Examples 2 to 4, blending OBC at 5 to 20 wt % is preferable as it causes an increase of the expansion ratio (4.0 times or higher). What is even better, is to have OBC at around 10 wt % (8 to 12 wt %). Consequently, the climate control duct 18 with high expansion ratios approximately between 4.2 to 4.7 times can be obtained.

Moreover, the climate control duct 18 with an expansion ratio of 4.0 times or more can easily be obtained by foamed molding of a resin blend produced to have compounds of the long chained HDPE (homopolymer) at 40 to 60 wt %, compounds of the long chained PP (homopolymer) at 30 to 45 wt %, and compounds of OBC at 5 to 15 wt % (long chained HDPE, long chained PP, and OBC to total 100 wt %).

Moreover, the application of the climate control duct 18 in the present embodiment is not limited to automobiles. Appropriately changing the design of the climate control duct 18 will allow for application of the climate control duct 18 in carriers such as trains, ships and airplanes. The climate control duct 18 in the present embodiment is light-weight while having a certain degree of strength, and is able to be manufactured at a low cost. Therefore, use of this climate control duct 18 can reduce the cost of carriers as well as increasing fuel efficiency thereof.

Moreover, it is also possible to insert and mold the duct by placing a fin to control wind direction, between the pair of sheets P extruded from the extruding machine 12. With this, a duct having internal fins can be molded. In this procedure, a wider cross sectional area of the air passage can be secured by blow molding ribs controlling wind direction integrally with the duct, when compared to the procedure of molding ducts with unchanging contours. Due to this, drops in pressure can be controlled.

Also, in the production method of the present embodiment mentioned above, the resin sheet P is extruded downward from the T-Die 28A (28B) positioned above the split mold block 32A (32B). Next, the resin sheet P is compressed between the split mold block 32A and the split mold block 32B. A mechanism to maintain the resin sheet P becomes unnecessary with such method. Thus, the manufacturing device can be simplified. In other words, for example, a procedure where the resin sheet P is extruded horizontally from the T-Die 28A (28B) can also be considered. After that, the sheet P is compressed from top and bottom by the split mold block 32A and the split mold block 32B. However, under such method, a mechanism to control slacking of the sheet P, while placing the sheet P between the split mold block 32A and the split mold block 32B, would be necessary. On the other hand, in the production method of the present embodiment mentioned above, the resin sheet P extruded from the extruding machine 12 is placed between the split mold block 32A and the split mold block 32B while its own weight prevents deflection. Thus, it is possible to mold a duct with a simple mechanism.

Moreover, in the method of the present embodiment mentioned above, the thermoplastic foamed resin sheet P is adsorbed and retained by the frame 33A (33B). Therefore, a closed space can accurately be formed between the thermoplastic foamed resin sheet P and the cavity surface 116A (116B) of the split mold block 32A (32B). Therefore, by sucking the sheet P from the cavity surface 116A (116B), the shape of the cavity surface can .be reflected in the sheet P more accurately.

(Second Embodiment)

A second embodiment is explained below.

<Overview of Method of Molding Duct in Second Embodiment>

Figure 12A:
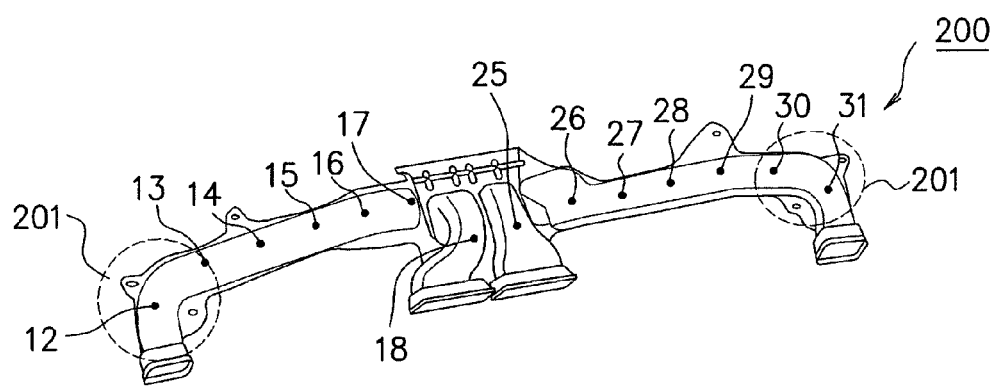
FIGS. 12A and 12B show configuration examples of an instrument panel duct in a second embodiment.
Figure 12B:
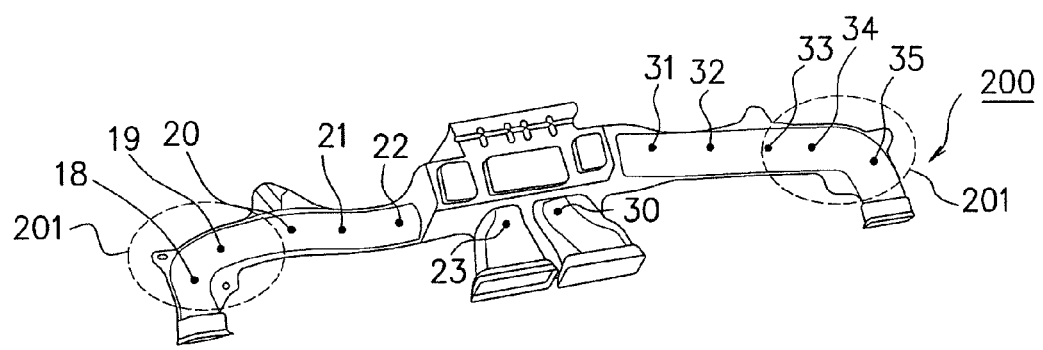

First, an overview of the duct molding method in the second embodiment is explained with reference to FIGS. 12A, 12B and 13 through 17. FIGS. 12A and 12B illustrate a configuration example of an instrument panel duct 200, which is an example of a duct. FIGS. 13 to 17 illustrate the example of the molding process in molding the instrument panel duct 200, which is an example of the duct in the second embodiment.

Figure 13:
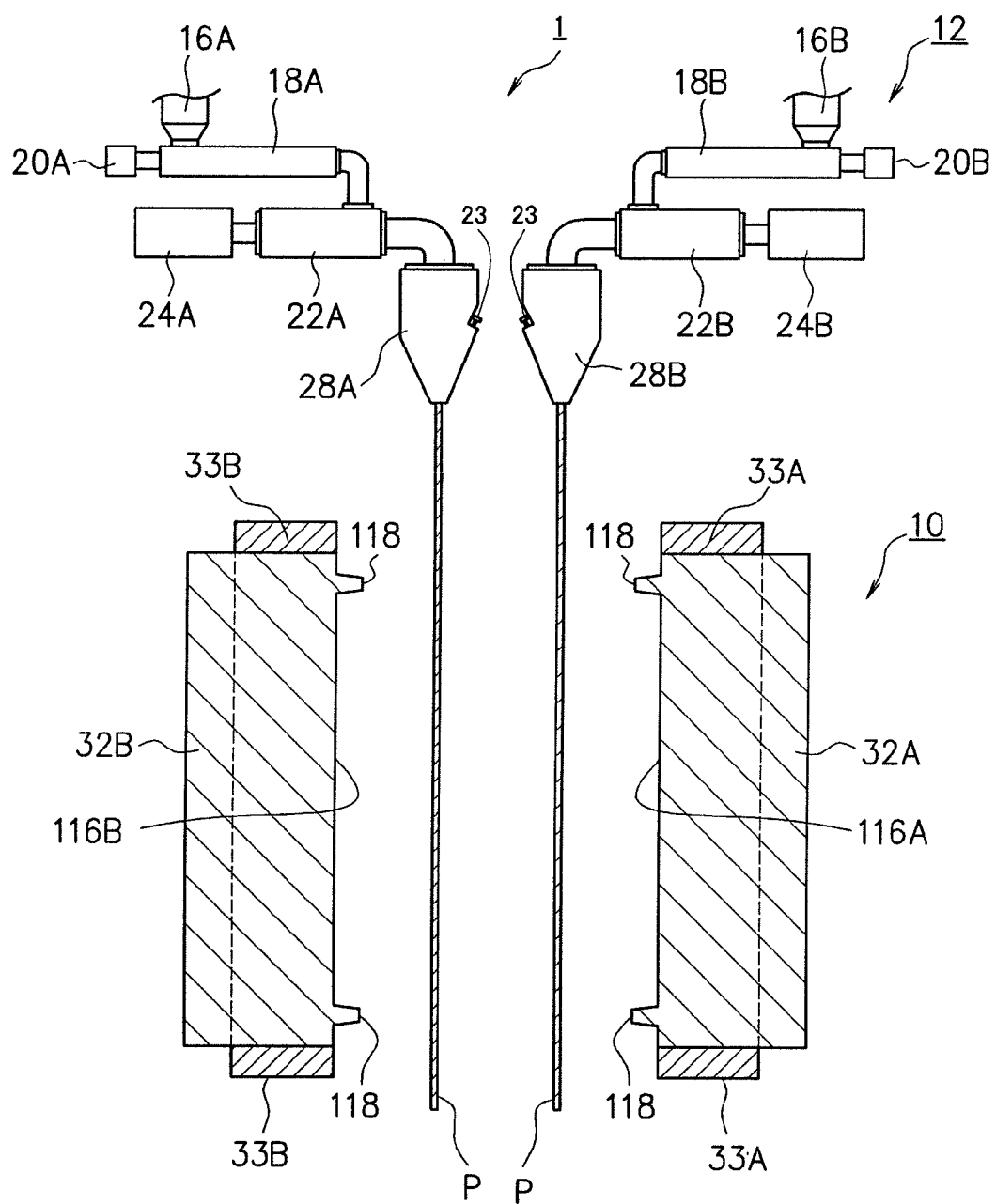
FIG. 13 shows a configuration example of a molding apparatus which molds instrument panel ducts in the second embodiment.

In the duct molding method in the present embodiment, a thermoplastic resin mixed with inorganic filler is melted and mixed. The molten and mixed thermoplastic resin is extruded as a sheet. Then, as shown in FIG. 13, the molten thermoplastic resin sheet P is placed between the split mold blocks 32A and 32B. Next, as shown in FIG. 16, the split mold block 32A and the split mold block 32B are closed after the processes shown in FIGS. 14 through 16. This allows the thermoplastic resin sheet P to be formed in a shape according to the mold. As a result, the duct illustrated in FIGS. 12A and 12B is formed.

In the present embodiment, the following conditions are met in order to reduce the likeliness of folds occurring, even when a duct of complex shape is formed, by controlling occurrence of the curtain effect.

$$W \geq 2M^2 - 11M + 18$$

where,

M: Melt flow rate (g/10 minutes) of the thermoplastic resin at 230° C.

W: Inorganic filler volume (wt %) mixed into the thermoplastic resin

In the duct molding method in the present embodiment, the curtain effect is controlled because the thermoplastic resin sheet P is formed to meet the above requirements. Due to this, it becomes harder for folds to be produced, even when a duct of complex shape is being formed. Therefore, even when forming the instrument panel duct 200 as illustrated in FIGS. 12A and 12B, it is harder for folds to be produced. The instrument panel duct 200 is a complex shaped duct having thin walls (e.g. an average wall thickness of 2 mm or less) as well as a bent section 201 bending at a predetermined angle or more (for example, 60 degrees or more). The duct molding method in the second embodiment is explained in detail below, with reference to the attached drawings. However, in the following embodiment, an example of forming the instrument panel duct 200 illustrated in FIGS. 12A and 12B as a duct is explained.

<Configuration Example of Instrument Panel Duct 200>

First, the configuration example of the instrument panel duct 200 in the present embodiment is explained, with reference to FIGS. 12A and 12B. FIGS. 12A and 12B illustrate the configuration example of the instrument panel duct 200 in the present embodiment. FIG. 12A shows a first surface side of the instrument panel duct 200 and FIG. 12B shows a second surface side of the instrument panel duct 200.

The average wall thickness of the instrument panel duct 200 in the present embodiment is 2 mm or less. In addition to this, the instrument panel duct 200 has the bent section 201 bent at a predetermined angle or more (60 degrees or more).

The average wall thickness in the present embodiment refers to an average value of wall thicknesses measured in at least 12 points set at approximately equal intervals along the length of the duct. Moreover, the average wall thickness of a hollow duct refers to an average value of wall thicknesses measured in at least 12 points set at approximately equal intervals along the length, for each side of the parting line of the duct (in this case, the wall thickness is measured in at least 24 points in total). However, parts that are compressed by the split mold blocks, such as the flange part, should be excluded from the measurement points.

Moreover, the average wall thickness of the instrument panel duct 200 in the present embodiment is the average value of the wall thicknesses measured in 14 points of the first surface, positions 12 to 18, and 25 to 31, of the instrument panel duct 200, as shown in FIG. 12A, and wall thicknesses measured in 12 points of the second surface, positions 18 to 23, and 30 to 35, of the instrument panel duct 200, as shown in FIG. 12B.

The bent section 201 is a portion bent at a predetermined angle or more (60 degrees or more). As shown in FIGS. 12A and 12B, both the tips of the instrument panel duct 200 have the bent section 201 bent at around 90 degrees. The average wall thickness of the bent section 201 is 2 mm or less. It is possible to set the bending angle of the bent section 201 within the range of 60 to 120 degrees.

The instrument panel duct 200 in the present embodiment has a cavity within the duct. Fluids, such as air, flow through this cavity. Moreover, the shape shown in FIGS. 12A and 12B is an example of an instrument panel duct of the present embodiment. The shape of the instrument panel duct of the present embodiment is not restricted to the shape shown in FIGS. 12A and 12B. Ducts with various shapes can be molded with the duct molding method shown in the present embodiment.

<Example of Molding Method of Instrument Panel Duct 200>

Next, an example of the molding method of the instrument panel duct 200 in the present embodiment is explained with reference to FIGS. 13 through 17. FIG. 13 shows a configuration example of the molding apparatus 1, forming the instrument panel duct 200 of the present embodiment. FIGS. 13 through 17 show the example of the molding procedure to mold the instrument panel duct 200 of the present embodiment.

First, the configuration example of the molding apparatus 1 forming the instrument panel duct 200 of the present embodiment is explained with reference to FIG. 13.

The molding apparatus 1 forming the instrument panel duct 200 of the present embodiment includes the extruding machine 12 and the clamping machine 10. From the extruding machine 12, the molten thermoplastic resin sheet P is extruded to the clamping machine 10. In the clamping machine 10, two thermoplastic resin sheets P are placed between a pair of split mold blocks. As these mold blocks are closed, the two sheets stick to inner surfaces (the cavity surfaces) of the split mold blocks. In this way, the instrument panel duct 200, as shown in FIGS. 12A and 12B, is formed.

The extruding machine 12 has the cylinders 18A and 18B, screws (not illustrated), the electric motors 20A and 20B, the accumulators 22A and 22B, the plungers 24A and 24B, and the T-Dies 28A and 28B. The hopper 16A (16B) is attached to the cylinder 18A (18B). The screws are arranged inside the cylinder 18A (18B). The electric motor 20A (20B) is connected with the screws. The accumulator 22A (22B) communicates with the cylinder 18A (18B). The plunger 24A (24B) communicates with the accumulator 22A (22B).

In the extruding machine 12 of the present embodiment, resin pellets introduced from the hopper 16A (16B) are melted and mixed in the cylinder 18A (18B) by rotating the screws with the help of the electric motor 20A (20B). This forms a resin in a molten state (molten resin). Next, this molten resin is transferred to the accumulator 22A (22B) where a fixed volume of the molten resin is retained. The molten resin is sent toward the T-Die 28A (28B) driven by the plunger 24A (24B). Due to this, the thermoplastic resin sheet P is extruded in a continuous sheet form from the extrusion slit (not illustrated) of the T-Die 28A (28B). The thermoplastic resin sheet P, extruded from the extrusion slit of the T-Die 28A (28B), is suspended between the split mold block 32A and the split mold block 32B. Subsequently, the thermoplastic resin sheet P is placed between the split mold block 32A and the split mold block 32B vertically (in its extruding direction) with uniform thickness.

The extrusion capacity of the extruding machine 12 is appropriately selected by taking into consideration the size of the duct to be molded, and prevention of draw-down or necking-in of the thermoplastic resin sheet P. Especially for practical purposes, the extrusion volume of a single shot in the intermittent extrusion would preferably be 1 to 10 kg. Moreover, the extrusion speed of the thermoplastic resin sheet P from the extrusion slit should be a several hundred kg/hour or more, preferably 700 kg/hour or more. Moreover, in order to prevent draw-down or necking-in from occurring on the thermoplastic resin sheet P, an extrusion time of the thermoplastic resin sheet P should preferably be as short as possible. This depends on the type of resin, MFR value, MT value, but in general, it is preferable to complete an extrusion in 40 seconds or less, more preferably in 10 to 20 seconds or less.

Therefore, the extrusion volume of the thermoplastic resin from the extrusion slit per area unit (1 cm$^2$) and time unit (h) is 50 kg/h/cm$^2$ or more, more preferably 150 kg/h/cm$^2$ or more. For example, consider the thermoplastic resin sheet P, with a thickness of 1.0 mm, width of 1000 mm, and length in the extruding direction of 2000 mm, is extruded in 15 seconds from the extrusion slit of the T-Die 28A (28B) where the slit gap is 0.5 mm, and the slit width is 1000 mm, using a thermoplastic resin with a density of 0.9 g/cm$^3$. In this case, 1.8 kg of thermoplastic resin will be extruded in 1 shot of 15 seconds. The extrusion speed is 432 kg/hour, and the extrusion speed per unit area is calculated as 86 kg/h/cm$^2$.

Moreover, the extrusion slit provided in the T-Die 28A (28B) is located to point vertically downward. The thermoplastic resin sheet P extruded from the extrusion slit is sent hanging, straight down from the extrusion slit. The thickness of the thermoplastic resin sheet P can be changed by changing the slit gaps of the extrusion slit.

However, at the time when the thermoplastic resin sheet P extruded from the T-Die 28A (28B) is suspended between the split mold block 32A and the split mold block 32B, or in other words at the time when the split mold block 32A and the split mold block 32B are closed, adjustment of the thickness in the extruding direction of the resin sheet P is desirable so that this thickness becomes uniform. Therefore, this changing can be done in such a way that the slit gap starts widening gradually after the extrusion starts and reaches the maximum when extrusion is completed. Consequently, the thickness of the thermoplastic resin sheet P extruded from the T-Die 28A (28B) will gradually become thicker after extrusion begins. However, since the thermoplastic resin sheet P extruded in a molten form becomes stretched (draw-down effect) due to its own weight, the thickness of the sheet P tends to be gradually thinner toward upper sections. Thus, the part where the slit gap is widened and made thick, and the part stretched and made thin due to the draw-down effect, balance each other out. Thus, the thickness of the sheet P can be adjusted to be uniform from top to bottom.

The clamping machine 10 of the present embodiment has the split mold blocks 32A and 32B and a mold driving device (not illustrated). The mold driving device moves the split mold blocks 32A and 32B between open and closed positions in a direction approximately perpendicular to the feed direction of the thermoplastic resin sheet P.

The split mold blocks 32A and 32B are arranged approximately vertically with the cavity surface 116A and the cavity surface 116B facing each other. On the surface of the cavity surface 116A (116B), an irregular portion is provided according to the shape and surface of the molded product which is molded from the molten thermoplastic resin sheet P. Further, the pinch-off molding part 118 is formed around the cavity surface 116A (116B) of the split mold block 32A (32B). This pinch-off molding part 118 is formed circularly around the cavity surface 116A (116B) and protrudes toward the opposing mold block 32A or 32B. Thus, when the split mold block 32A and the split mold block 32B are closed, the tips of the pinch-off molding parts 118 come in contact with each other. As a result, the parting line PL can be formed in the peripheral of the molded product.

Also, along the perimeter of the spilt mold block 32A (32B), the frame 33A (33B) is slidably arranged. The frame 33A (33B) can move relative to the split mold block 32A (32B). More specifically, the frame 33A protrudes toward the split mold block 32B. This frame 33A can be brought into contact with one side of the thermoplastic resin sheet P, arranged between the split mold block 32A and the split mold block 32B. Also, the other frame 33B protrudes toward the split mold block 32A. This frame 33B can be brought into contact with the other side of the thermoplastic resin sheet P that is arranged between the split mold block 32A and the split mold block 32B.

The split mold block 32A (32B) is driven by the mold driving device (not illustrated). When the split mold blocks 32A and 32B are open, the molten thermoplastic resin sheet P can be placed therebetween. Also, when the split mold blocks 32A and 32B are closed, the pinch-off molding parts 118 of the split mold blocks 32A and 32B come into contact with each other. Thus, an enclosed space is formed inside the split mold blocks 32A and 32B. Further, the closed position of the split mold blocks 32A and 32B is the center line of the molten thermoplastic resin sheet P. The split mold blocks 32A and 32B move toward that position, driven by the mold driving device.

The thermoplastic resin sheet P is made from, for example, polypropylene, and polyolefin resins. The resin material of the thermoplastic resin sheet P of the present embodiment should preferably have a high melting tension, in order to prevent occurrences of variations in the thickness of the resin sheet P due to draw-down or necking-in. On the other hand, in order to improve the transcription properties and traceability of the split mold block 32A (32B), it is preferable to have the thermoplastic resin sheet P with a resin material having high liquidity.

As the material of the thermoplastic resin sheet P, in particular, polyolefin which is a homopolymer or copolymer of ethylene, propylene, butene, isoprene, pentene, methylpentene and other olefins (for example, polypropylene, high density polyethylene) having an MFR of 3.5 g/10 minutes or less at 230° C. (measured under the testing temperature of 230° C., and a testing load of 2.16 kg, in accordance with JIS K-7210) can be used. If the MFR becomes greater than 3.5 g/10 minutes, draw-down of the thermoplastic resin sheet P becomes severe. This makes it difficult to form thinner-walled moldings.

Also, in the thermoplastic resin sheet P of the present embodiment, powdered inorganic fillers such as silica, mica, talc, and calcium carbonate, or fibrous inorganic fillers such as glass fibers and carbon fibers, are added. This is to form the instrument panel duct 200 of a complex geometry, having an average thickness of 2 mm or less and the bent section 201 bent at a predetermined angle or more (60 degrees or more). Thus, the instrument panel duct 200 having a thin average thickness, and a complex shape, can be formed. Further, if the volume of added inorganic fillers becomes large, it tends to cause roughness and pinholes on the surface of the molded product. Therefore, in order to reduce this roughness on the surface of the molded product, and to make the forming of pinholes more difficult, the volume of inorganic fillers added should preferably be less than 30% by weight.

Further, while molding the instrument panel duct 200 of the present embodiment, use of powdered fillers rather than fibrous fillers is preferred. This is because, with fibrous fillers, the fibers are oriented in the extruding direction. Therefore, this makes it difficult to remove wrinkles that appear perpendicularly to the direction of extrusion. Also, among the powdered fillers, particularly, it is preferable to use talc. This is because talc has good dispersibility in resins.

Also, in the thermoplastic resin sheet P, in order to prevent cracking due to impact, a hydrogenated styrene thermoplastic elastomer can be added at less than 30 wt %, preferably less than 15 wt %. Styrene-ethylene-butylene-styrene block copolymers, styrene-ethylene-propylene-styrene block copolymers, hydrogenated styrene-butadiene rubber, and mixtures of these can be used as hydrogenated styrene thermoplastic elastomers.

Also, plasticizers, stabilizers, colorants, antistatic agents, flame retardants, and foaming agents can be added in the thermoplastic resin sheet P.

Next, the molding process example of the instrument panel duct 200 of the present embodiment is explained with reference to FIGS. 13 through 17.

First, as shown in FIG. 13, the thermoplastic resin sheet P is extruded from the T-Dies 28A and 28B. The extruded thermoplastic resin sheet P is suspended down between the pair of the split mold block 32A and the split mold block 32B.

Figure 14:
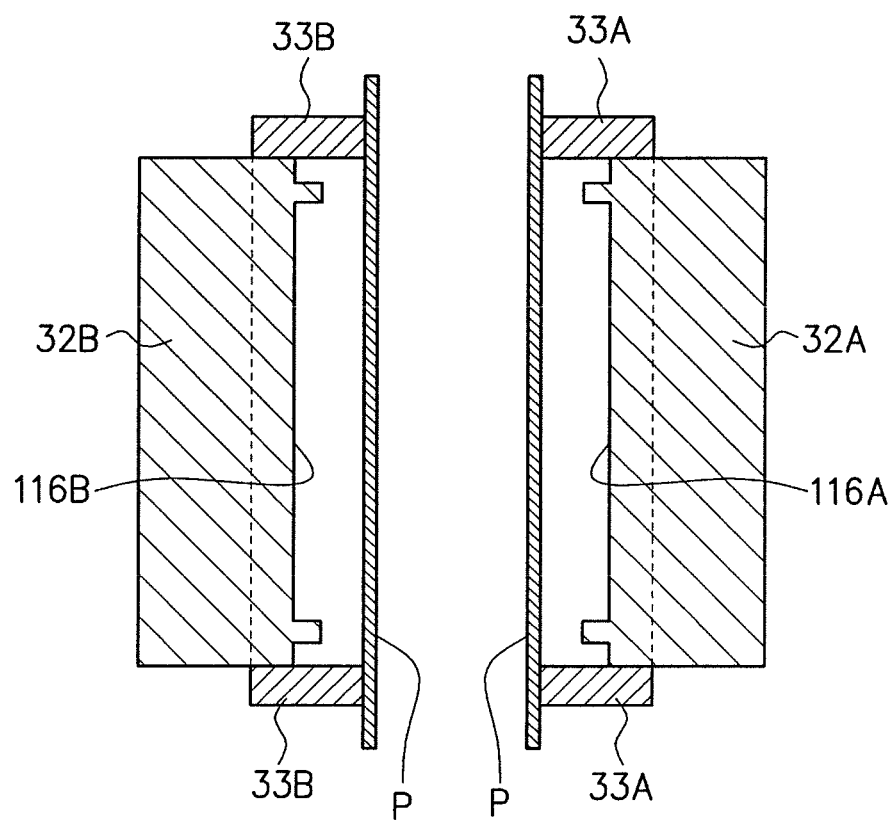
FIG. 14 shows the state wherein, a thermoplastic resin sheet is placed within the split mold blocks inside the molding apparatus shown in FIG. 13, and the space between the cavity surfaces of the split mold blocks is closed by a frame.

As shown in FIG. 13, after arranging the two thermoplastic resin sheets P between the split mold block 32A and the split mold block 32B, as shown in FIG. 14, the frame 33A (33B) of the split mold block 32A (32B) is moved toward the thermoplastic resin sheet P. Thus, the frame 33A (33B) located along the perimeter of the split mold block 32A (32B) contacts the side of the thermoplastic resin sheet P. Thus, a closed space is formed by the thermoplastic resin sheet P, the frame 33A (33B) and the cavity surface 116A (116B).

Figure 15:
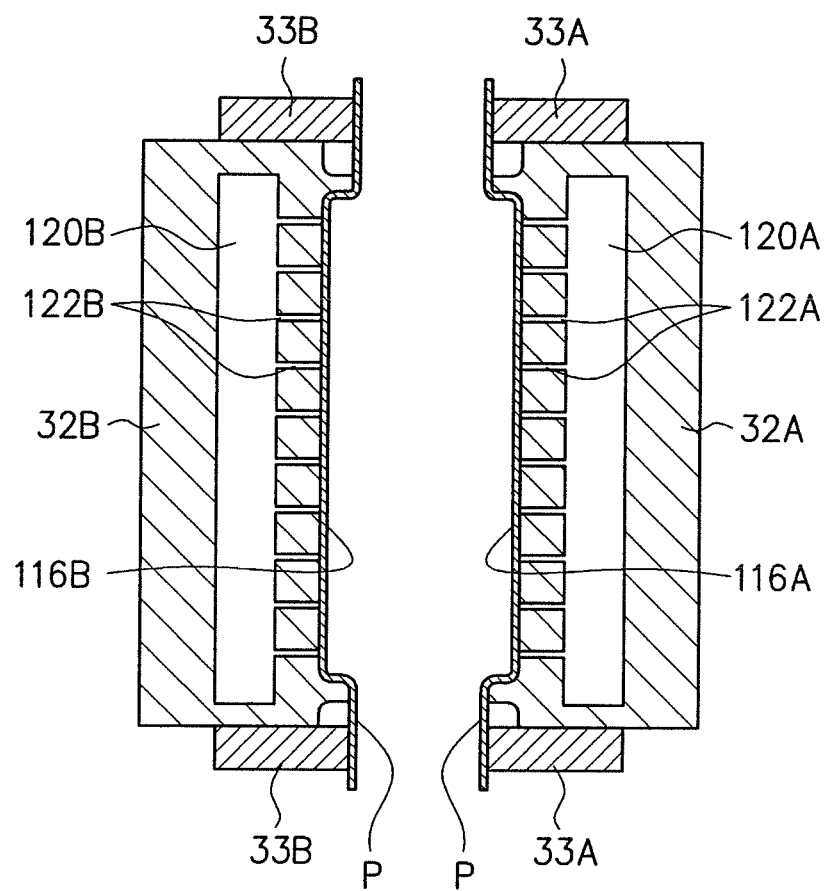
FIG. 15 shows the state wherein, the thermoplastic resin sheet in its condition shown in FIG. 14, is adsorbed onto the cavity surfaces of the split mold blocks by a vacuum.
Figure 16:
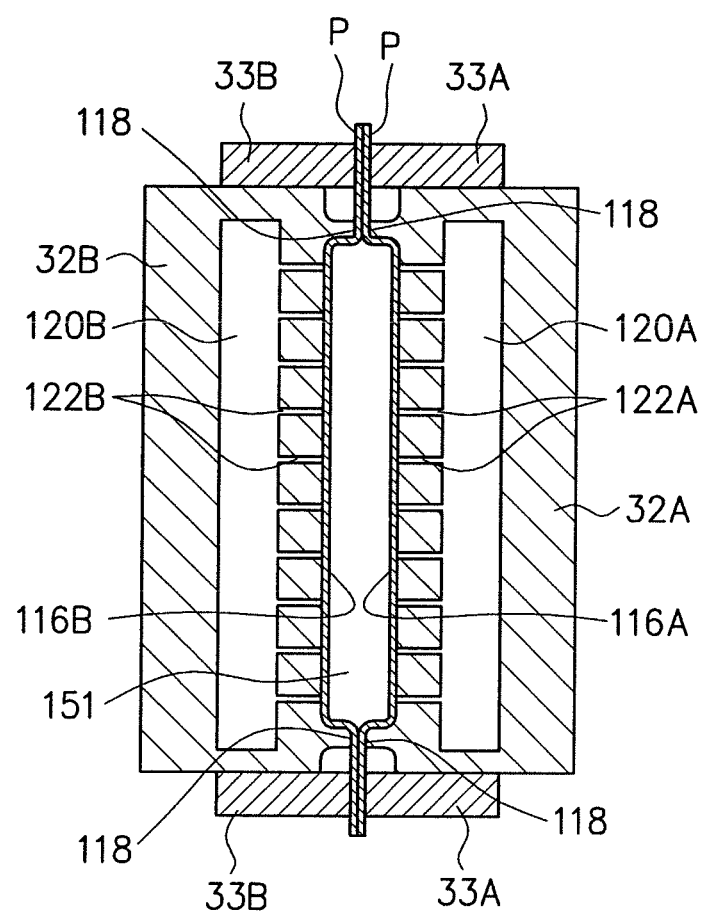
FIG. 16 shows closed split mold blocks, following the condition shown in FIG. 15.

Next, as shown in FIG. 15, the air in the enclosed space is sucked from a vacuum suction chamber 120, through a suction hole 122. Thus, the thermoplastic resin sheet P is adsorbed onto the cavity surface 116A (116B). As a result of this, the form of the thermoplastic resin sheet P is shaped along the cavity surface 116A (116B).

Further, the thickness of the thermoplastic resin sheet P, before the suction takes place, is uniform throughout its length. Thus, situations, such as an unsatisfactory shaping process due to the thickness distribution coming from the blow ratio, can be prevented.

Next, as shown in FIG. 16, the split mold block 32A and the split mold block 32B move with the respective frames 33A and 33B, and are placed closer to one another. Thus, the split mold block 32A and the split mold block 32B are closed. After this, the peripheral of the thermoplastic resin sheet P is fused by the pinch-off molding part 118 of the split mold block 33. Thus, the parting line PL is formed on the joining surfaces of the two thermoplastic resin sheets P. Further, a hollow-sealed portion 151 is formed within the two thermoplastic resin sheets P.

Figure 17:
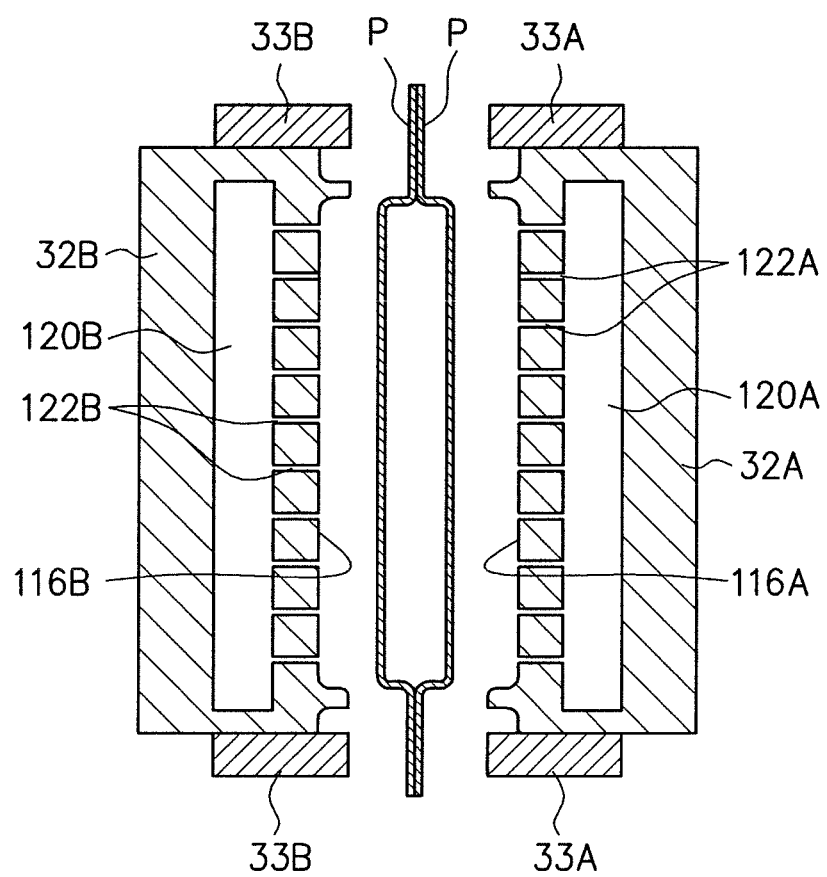
FIG. 17 shows opened split mold blocks, from the condition illustrated in FIG. 16.

Next, as shown in FIG. 17, the split mold block 32A and the split mold block 32B, along with the respective frames 33A and 33B, are moved away from each other. This opens the split mold blocks 32A and 32B, for removal of the duct and removal of the burr along the peripheral. In this way, the instrument panel duct 200, as shown in FIGS. 12A and 12B, can be molded.

EXAMPLES

Next, Examples of the embodiments mentioned above are explained. However, the following are only a few examples. The technical concepts of the present embodiment are not limited to these following examples.

The instrument panel duct 200 of complex shape and having the bent section 201, as shown in FIGS. 12A and 12B, was molded with appropriate changes in the material used while molding the product, and by the molding method shown in FIGS. 13 through 17 mentioned above. Here, the material used in molding the instrument panel duct 200, as shown in FIGS. 12A and 12B, is described with each of the implementation and comparative examples.

Example 1

Product "Novatec grade EC9 (MFR=0.5 g/10 minutes)" manufactured by Japan Polypropylene Corporation was used as the propylene homopolymer. The MFR value is measured under the testing temperature of 230° C., with a testing load of 2.16 kg, in accordance with JIS-K7210.

Also, the content of the talc was 15 wt %. The particle size of the talc used was 6 to 7 μm. Further, it is preferable that the particle size of the talc be in the range of 2 to 30 μm. Thus, dispersion of the talc in the resin is comparatively better.

Example 2

Product "Novatec grade EC9 (MFR=0.5 g/10 minutes)" manufactured by Japan Polypropylene Corporation was used as the propylene homopolymer.

Also the content of the talc was 20 wt %. The talc used was similar to the one used in Example 1.

Example 3

Product "Novatec grade EC9 (MFR=0.5 g/10 minutes)" manufactured by Japan Polypropylene Corporation was used as the propylene homopolymer.

Also, the content of the talc was 30 wt %. The talc used was similar to the one used in Example 1.

Example 4

Product "Novatec grade EC7 (MFR=1.5 g/10 minutes)" manufactured by Japan Polypropylene Corporation was used as the propylene homopolymer.

Also, the content of the talc was 8 wt %. The talc used was similar to the one used in Example 1.

Example 5

Product "Novatec grade EC7 (MFR=1.5 g/10 minutes)" manufactured by Japan Polypropylene Corporation was used as the propylene homopolymer.

Also, the content of the talc was 15 wt %. The talc used was similar to the one used in Example 1.

Example 6

Product "Novatec grade EC7 (MFR=1.5 g/10 minutes)" manufactured by Japan Polypropylene Corporation was used as the propylene homopolymer.

Also, the content of the talc was 25 wt %. The talc used was similar to the one used in Example 1.

Example 7

Product "Noblen H501 (MFR=3.0 g/10 minutes)" manufactured by Sumitomo Chemical Co., Ltd. was used as the propylene homopolymer.

Also, the content of the talc was 5 wt %. The talc used was similar to the one used in Example 1.

Example 8

Product "Noblen H501 (MFR=3.0 g/10 minutes)" manufactured by Sumitomo Chemical Co., Ltd. was used as the propylene homopolymer.

Also, the content of the talc was 10 wt %. The talc used was similar to the one used in Example 1.

Example 9

Product "Noblen H501 (MFR=3.0 g/10 minutes)" manufactured by Sumitomo Chemical Co., Ltd. was used as the propylene homopolymer.

Also, the content of talc was 20 wt %. The talc used was similar to the one used in Example 1.

Comparative Example 1

Product "Novatec grade EC9 (MFR=0.5 g/10 minutes)" manufactured by Japan Polypropylene Corporation was used as the propylene homopolymer.

Also, the content of talc was 0 wt %.

Comparative Example 2

Product "Novatec grade EC9 (MFR=0.5 g/10 minutes)" manufactured by Japan Polypropylene Corporation was used as the propylene homopolymer.

Also, the content of talc was 10 wt %. The talc used was similar to the one used in Example 1.

Comparative Example 3

Product "Novatec grade EC7 (MFR=1.5 g/10 minutes)" manufactured by Japan Polypropylene Corporation was used as the propylene homopolymer.

Also, the content of talc was 0 wt %.

Comparative Example 4

Product "Novatec grade EC7 (MFR=1.5 g/10 minutes)" manufactured by Japan Polypropylene Corporation was used as the propylene homopolymer.

Also, the content of talc was 5 wt %. The talc used was similar to the one used in Example 1.

Comparative Example 5

Product "Noblen H501 (MFR=3.0 g/10 minutes)" manufactured by Sumitomo Chemical Co., Ltd. was used as the propylene homopolymer.

Also, the content of talc was 0 wt %.

Figure 18:
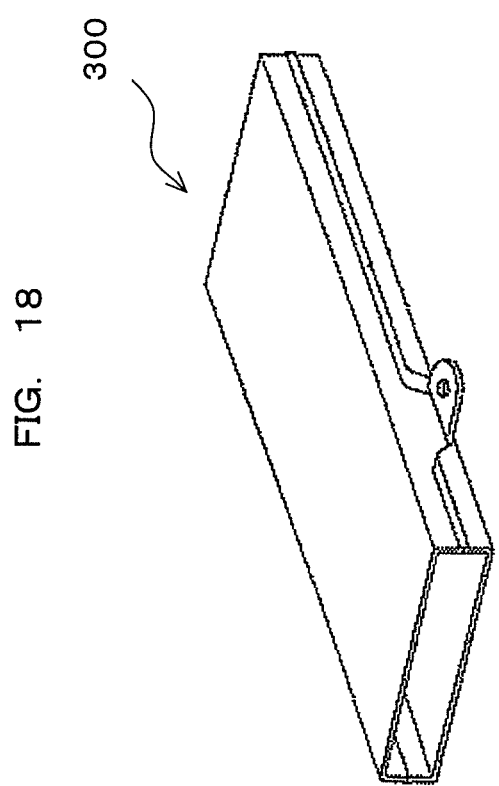
FIG. 18 is a configuration example of a straight duct.

Also, a linear shaped duct 300, as shown in FIG. 18, without the bent section 201 (see FIGS. 12A and 12B), was formed by appropriately changing the material used, and by the molding method shown in FIGS. 13 through 17 mentioned above. Here, the linear shaped duct 300, as shown in FIG. 18, does not have the bent section 201 as seen on the instrument panel duct 200, as shown in FIGS. 12A and 12B, and is entirely linear. Below, the materials used in molding the linear shaped duct 300, is described with each Comparative Example.

Comparative Example 6

Product "Novatec grade EC9 (MFR=0.5 g/10 minutes)" manufactured by Japan Polypropylene Corporation was used as the propylene homopolymer.

Also, the content of talc was 0 wt %.

Comparative Example 7

Product "Novatec grade EC9 (MFR=0.5 g/10 minutes)" manufactured by Japan Polypropylene Corporation was used as the propylene homopolymer.

Also, the content of talc was 10 wt %. The talc used was similar to the one used in Example 1.

Comparative Example 8

Product "Novatec grade EC7 (MFR=1.5 g/10 minutes)" manufactured by Japan Polypropylene Corporation was used as the propylene homopolymer.

Also, the content of talc was 0 wt %.

Comparative Example 9

Product "Novatec grade EC7 (MFR=1.5 g/10 minutes)" manufactured by Japan Polypropylene Corporation was used as the propylene homopolymer.

Also, the content of talc was 5 wt %. The talc used was similar to the one used in Example 1.

Comparative Example 10

Product "Noblen H501 (MFR=3.0 g/10 minutes)" manufactured by Sumitomo Chemical Co., Ltd. was used as the propylene homopolymer.

Also, the content of talc was 0 wt %.

Figure 21:
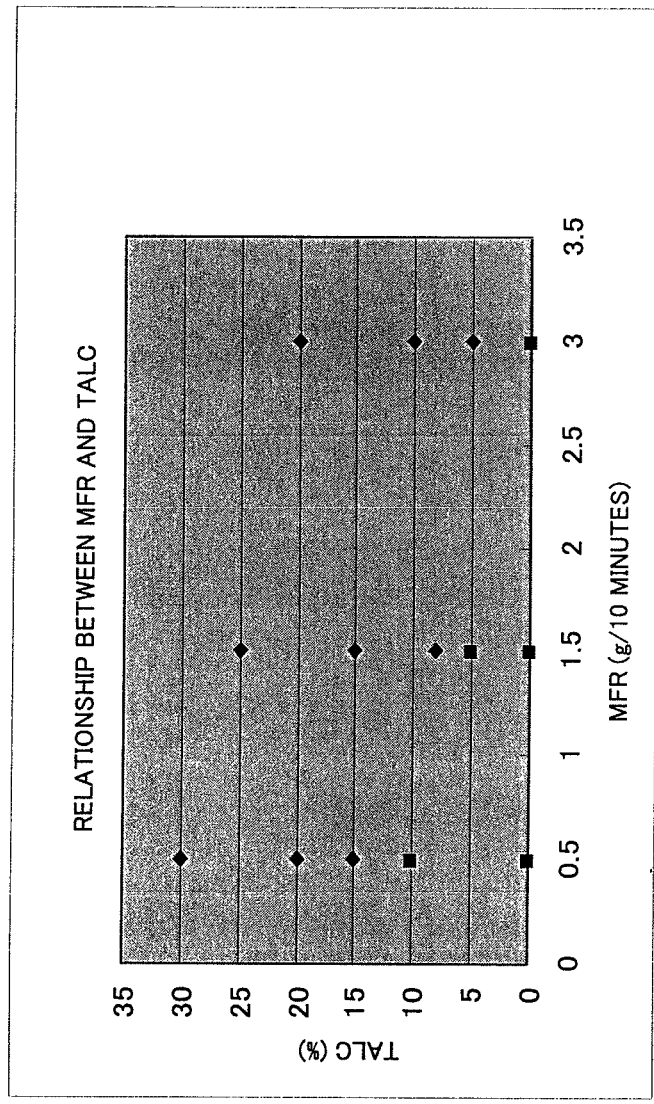
FIG. 21 shows the relation between MFR (g/10 minutes) and talc content (wt %)

FIG. 19 shows the presence/absence of folded breaks and pinholes when molding the instrument panel duct 200 of complex shape having the bent section 201, as shown in FIGS. 12A and 12B. Also, FIG. 20 shows the presence/absence of folded breaks and pinholes in the molding of the instrument panel duct 300 having a linear shape and without the bent section 201, as shown in FIG. 18. Also, FIG. 19 shows the MFR (g/10 minutes) and talc content (wt %) mentioned in Examples 1 through 9, and Comparative Examples 1 through 5. The relation between MFR and talc content, in Examples 1 through 9 and Comparative Examples 1 through 5, is shown in FIG. 21.

<Results Shown in FIGS. 19 and 20>

From the results shown in FIG. 19, when the thermoplastic resin sheet P with MFR of 0.5 g/10 minutes and talc content of 30 wt % was used (in the case of Example 3) in molding the instrument panel duct 200 of complex shape having the bent section 201, as shown in FIGS. 12A and 12B, it became clear that pinholes appeared although there were no folded breaks. Furthermore, when the thermoplastic resin sheet P with MFR of 1.5 g/10 minutes and talc content of 30 wt % was used, similar to Example 3, pinholes occurred although there were no folded breaks. Also, when the thermoplastic resin sheet P with MFR of 3.0 g/10 minutes and talc content of 30 wt % was used, similar to Example 3, pinholes appeared although there were no folded breaks. This made it clear that pinholes appear when the thermoplastic resin sheet P with a talc content of 30 wt % or more is used, regardless of the MFR value.

Also, it was discovered that, when the thermoplastic resin sheet P with MFR of 0.5 g/10 minutes and talc content of 0 to 10 wt % is used (as in the cases of Comparative Examples 1 and 2), folded breaks would appear.

Also, it was discovered that, when the thermoplastic resin sheet P with MFR of 1.5 g/10 minutes and talc content of 0 to 5 wt % is used (as in the cases of Comparative Examples 3 and 4), folded breaks would appear.

Also, it was discovered that, when the thermoplastic resin sheet P with MFR of 3.0 g/10 minutes and talc content of 0 wt % is used (as in the case of Comparative Example 5), folded breaks will appear.

Further, it was discovered that, as the content of talc increased, the roughness of the surface of the instrument panel duct 200 worsened. Therefore, in order to reduce the roughness of the surface of the instrument panel duct 200, it was found to be preferable that the talc content should be kept minimal, under the conditions that there were no folded breaks.

Also, from the results shown in FIGS. 19 and 20, when the thermoplastic resin sheets P with MFR of 0.5 g/10 minutes and talc content of 0 to 10 wt % were used (as in the cases of Comparative Examples 1 and 2), in molding the instrument panel duct 200 of complex shape and having the bent section 201, as shown in FIGS. 12A and 12B, folded breaks appeared. On the other hand, it was found that, when the linear shaped duct 300, as shown in FIG. 18, was molded using this thermoplastic resin sheet P (in the cases of Comparative Examples 6 and 7), folded breaks did not appear.

Also, when the thermoplastic resin sheets P with MFR of 1.5 g/10 minutes and talc content of 0 to 5 wt % were used (as in the cases of Comparative Examples 3 and 4), in molding the instrument panel duct 200 of complex shape and having the bent section 201, as shown in FIGS. 12A and 12B, folded breaks appeared. On the other hand, it was found that, when the linear shaped duct 300, as shown in FIG. 18, was molded using this thermoplastic resin sheet P (as in the cases of Comparative Examples 8 and 9), folded breaks did not appear.

Also, when the thermoplastic resin sheet P with MFR of 3.0 g/10 minutes and talc content of 0 wt % was used (as in the case of Comparative Example 5), in molding the instrument panel duct 200 of complex shape and having the bent section 201, as shown in FIGS. 12A and 12B, folded breaks appeared. On the other hand, it was found that, when the linear shaped duct 300, as shown in FIG. 18, was molded using this thermoplastic resin sheet P (as in the case of Comparative Example 10), folded breaks did not appear.

From the results shown in FIGS. 19 and 20, it was found that when the thermoplastic resin sheet P meeting the conditions of having an MFR of 0.5 g/10 minutes or more and 3.0 g/10 minutes or less and a talc content of 5 wt % or more and less than 30 wt % is used, in molding the instrument panel duct 200 of complex shape and having the bent section 201, as shown in FIGS. 12A and 12B, molding of the instrument panel duct 200 is possible without folded breaks appearing. Furthermore, in molding the instrument panel duct 200 of complex shape and having the bent section 201, as shown in FIGS. 12A and 12B, even with the use of the thermoplastic resin sheet P meeting the conditions of having an MFR of 0.1 g/10 minutes or more and 3.5 g/10 minutes or less and a talc content of 5 wt % or more and less than 30 wt %, the instrument panel duct 200 could be molded without folded breaks appearing.

Also, it was found from the relationship between MFR (g/10 minutes) and talc content (wt %) as shown in FIG. 21 that, when molding the instrument panel duct 200 of complex shape and having the bent section 201, as shown in FIGS. 12A and 12B, using the thermoplastic resin sheet P fulfilling the conditional expression 1 shown below, the instrument panel duct 200 could be molded without instances of the curtain effect and folded breaks.

$$W \geq 2M^2 - 11M + 18 \quad \text{Conditional Expression 1}$$

where,

M: Melt flow rate (g/10 minutes) of thermoplastic resin at 230° C.

W: Volume of talc (wt %) mixed into the thermoplastic resin

Also, it was discovered that, by using the thermoplastic resin sheet P that fulfills the following conditional expression 2, the instrument panel duct 200 could be molded without instances of folded breaks or pinholes.

$$30 > W \geq 2M^2 - 11M + 18 \qquad \text{Conditional Expression 2}$$

Also, it was discovered that, by using the thermoplastic resin sheet P that fulfills the following conditional expression 3, the instrument panel duct 200 could be molded without instances of folded breaks or roughness of the duct surface.

$$2M^2 - 11M + 23 \geq W \geq 2M^2 - 11M + 18 \qquad \text{Conditional Expression 3}$$

Furthermore, in the above mentioned embodiment and examples, the instrument panel duct 200 is molded using the molding apparatus 1, as shown in FIG. 13. However, it is also possible to mold the instrument panel duct 200 using the molding apparatus 1 equipped with a pair of rollers 30AA and 30AB (pair of rollers 30BB and 30BA), as shown in FIG. 1.

Further, the pair of rollers 30AA and 30AB and the pair of rollers 30BB and 30BA, as shown in FIG. 1, have the same structure. Thus, in the following, as shown in FIG. 22, the roller pair including the pair of rollers is referred to as a roller pair 30. Also, the rollers AA and BA are rotary drive rollers, while the rollers AB and BB are rotary driven rollers (driven rollers). In the following, as shown in FIG. 22, the rollers AA and BA are referred to as roller A or rotary drive roller 30A. Also, the rollers AB and BB are referred to as roller B or rotary driven roller 30B.

In the molding apparatus 1 shown in FIG. 1, the thickness of the thermoplastic resin sheet P extruded from the T-Die 28A (28B) is adjusted by passing the thermoplastic resin sheet P through the roller pair 30. After that, the thermoplastic resin sheet P is suspended between the pair of split mold blocks 32A and 32B. Even with this molding apparatus 1, as shown in FIG. 1, the curtain effect may occur and affect the thermoplastic resin sheet P being extruded from the T-Die 28A (28B), causing wrinkles to appear in the thermoplastic resin sheet P. However, with the molding apparatus 1, as shown in FIG. 1, the thickness of the thermoplastic resin sheet P is adjusted by passing the thermoplastic resin sheet P through the roller pair 30. This decreases the wrinkles appearing in the thermoplastic resin sheet P. However, if the thermoplastic resin sheet P with curtain effects occurring is forced through the roller pair 30, folded breaks may appear by the roller pair 30 folding the wrinkles in the thermoplastic resin sheet P. Also, it is difficult to pass the thermoplastic resin sheet P through the roller pair 30 when the curtain effect occurs. For this reason, the thermoplastic resin sheet P may be retained on the upper part of the roller pair 30. In such a case, the thermoplastic resin sheet P of uniform thickness cannot be formed, or folded breaks and wrinkles are generated in the thermoplastic resin sheets P. Therefore, even with the molding apparatus 1, as shown in FIG. 1, similar to the molding apparatus 1, as shown in FIG. 13, folded breaks may make it difficult to mold a duct conforming to the mold, depending on the geometry of the mold that molds the duct. As a result, even when molding the instrument panel duct 200 using the molding apparatus 1, as shown in FIG. 1, it is preferred that the thermoplastic resin sheet P fulfill conditional expressions 1 through 3 mentioned above. Thus, it is possible to prevent the curtain effect from occurring in the thermoplastic resin sheet P as it is extruded from the T-Die 28A (28B). Therefore, it would then be possible to mold the instrument panel duct 200 without any folded breaks. Furthermore, when the roller pair 30 is used, it is also possible to mold the instrument panel duct 200 to have an average thickness of 1 mm or less. Also, in the embodiment mentioned above, molding of a hollow duct was explained. However, the present embodiment can also be applied to the molding of a non-hollow duct using a single sheet.

(Third Embodiment)

Next, a third embodiment is explained.

<Overview of Molding Method of Duct in Third Embodiment>

To start with, an overview of the molding method of a duct according to the third embodiment is explained with reference to FIG. 1, FIGS. 12A and 12B, and 14 through 17. FIGS. 12A and 12B show the configuration example of the instrument panel duct 200, which is an example of a duct in the third embodiment. FIGS. 1, and 14 through 17 are figures showing the molding process example of when the instrument panel duct 200, an example of a duct as shown in FIGS. 12A and 12B, is molded.

In the molding method of a duct in the present embodiment, the thermoplastic resin is melted and mixed. After that, the molten and mixed thermoplastic resin is extruded into a sheet. Then, this molten thermoplastic resin sheet P is suspended downward. Further, as shown in FIG. 1, the thermoplastic resin sheet P is sandwiched by the roller pair 30. The thermoplastic resin sheet P is then forwarded downward by the rotations of the roller pair 30. Then, the thermoplastic resin sheet P forwarded by the roller pair 30, after the processes shown in FIGS. 14 through 16, is closed within the split mold block 32A and the split mold block 32B, as shown in FIG. 16. Thus, the thermoplastic resin sheet P is shaped to conform to the geometry of the mold. As a result, the duct, as shown in FIGS. 12A and 12B, is formed.

In the present embodiment, in order to achieve control of the variation in thickness of the thinned thermoplastic resin sheet P, and molding of a thin duct having uniform thickness, the following conditions (A) or (B) are to be satisfied.

$$Va < 110, 3.0 \leq Va/Vb \leq 5.5 \qquad \text{Condition (A)}$$

$$Va \geq 110, 3.0 \leq Va/Vb < 605/Va \qquad \text{Condition (B)}$$

where,

Va: Transmission rate (mm/s) of the thermoplastic resin sheet P, by the roller pair 30

Vb: Extrusion rate of thermoplastic resin sheet P (mm/s)

In the molding method of a duct in the present embodiment, the transmission rate of the thermoplastic resin sheet P by the roller pair 30, and the extrusion rate of the thermoplastic resin sheet P are adjusted to meet the above conditions. Thus, the varying thickness of the thinned thermoplastic resin sheet P can be controlled. Then, a thin duct of uniform wall thickness can be molded. As a result, the instrument panel duct 200, as shown in FIGS. 12A and 12B, can be molded. This instrument panel duct 200 is thin and has a uniform wall thickness (e.g. average thickness of 1.0 mm or less). Also, the instrument panel duct 200 is a duct of complex shape and includes the bent section 201 which is bent at a predetermined angle or more (e.g., 60 degrees or more). Below, with reference to the attached drawings, the molding method of a duct in the present embodiment is explained in detail. In the following embodiment, the example explained is of when the instrument panel duct 200, as shown in FIGS. 12A and 12B, is molded as a duct.

<Configuration Example of Instrument Panel Duct 200>

First, with reference to FIGS. 12A and 12B, the configuration example of the instrument panel duct 200 in the present embodiment is explained. FIGS. 12A and 12B show the configuration example of the instrument panel duct 200 in the present embodiment. FIG. 12A shows the first side of the instrument panel duct 200, and FIG. 12B shows the second side of the instrument panel duct 200.

The average thickness of the instrument panel duct 200 in the present embodiment is 1.0 mm or less. Moreover, the instrument panel duct 200 includes the bent section 201 which is bent at a predetermined angle or more (60 degrees or more). The average thickness of the bent section 201 is 1.0 mm or less. Other configurations of the instrument panel duct 200 are the same as those of the instrument panel duct 200 in the second embodiment.

<Molding Method Example of Instrument Panel Duct 200>

Next, the molding method example of the instrument panel duct 200 in the present embodiment is explained with reference to FIGS. 1, 14 through 17, 22A, 22B, 23, and 24. FIG. 1 shows the configuration example of the molding apparatus 1 which molds the instrument panel duct 200 in the present embodiment. FIGS. 1 and 14 through 17 show the molding process example of molding the instrument panel duct 200 in the present embodiment. FIG. 22A, FIG. 22B, FIG. 23, and FIG. 24 show the detailed configuration examples of the roller pair 30.

In the molding apparatus 1 in the present embodiment, the thermoplastic resin sheet P is compressed by the roller pair 30, and is forwarded downward by the rotation of the roller pair 30. Due to this, the thermoplastic resin sheet P can be stretched and made thin. Draw-down and necking-in of the thermoplastic resin sheet P can be prevented by adjusting the relation between the extrusion rate of the thermoplastic resin sheet P being extruded by the T-Die 28A (28B), and the transmission rate of the thermoplastic resin sheet P being forwarded by the roller pair 30. Thus, the constraints on the characteristics of the resin used (MFR and MT values to be specific) and extrusion volume per time unit can be mitigated.

Figure 22A:
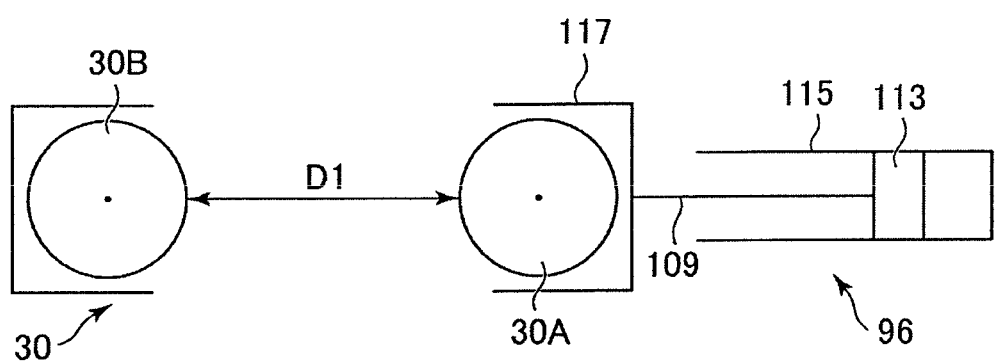
FIGS. 22A and 22B show configuration examples of a roller in the molding apparatus which molds instrument panel ducts in a third embodiment.
Figure 22B:
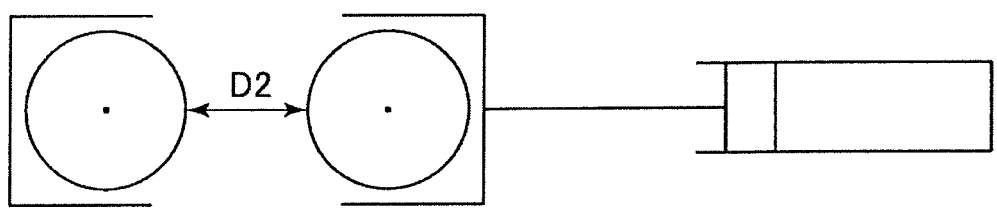

As shown in FIGS. 22A and 22B, the roller pair 30 includes the pair of rollers 30A and 30B. The rotational axis of each roller is arranged to be parallel to each other, below the extrusion slit, and almost horizontally. The roller 30A is a rotary drive roller, and the roller 30B is a rotary driven roller. More specifically, as shown in FIG. 1, the rollers 30A and 30B are arranged respectively symmetrical to each other in regards to the thermoplastic resin sheet P extruded from the extrusion slit and suspended downward.

The diameter of the roller 30A (30B) and the axial length of the roller 30A (30B) is appropriately set according to the extrusion rate, length in the extruding direction, width, and the type of resin of the thermoplastic resin sheet P to be molded. However, in the molding apparatus 1, the thermoplastic resin sheet P is forwarded downward by rotation of the roller pair 30 in a sandwiched state between the roller pair 30. In order to facilitate this feeding, the diameter of the rotary drive roller 30A should preferably be slightly larger than the rotary driven roller 30B. It is preferred that the diameter of the roller 30A (30B) be in the range of 50 to 200 mm. Curve rates of the roller 30A (30B) being either too big or too small can cause the thermoplastic resin sheet P to wrap around the roller 30.

Also, an uneven texture is provided on the surface of the roller 30A (30B). This uneven texture should preferably be uniformly distributed throughout the surface of the roller 30A (30B) coming in contact with the thermoplastic resin sheet P.

The density and depth of the uneven texture may be set in measures that allow for the thermoplastic resin sheet P to be smoothly forwarded downward by the roller pair 30, in other words, so that slippage does not occur between the surface of the roller 30A (30B) and the thermoplastic resin sheet P. Further, the uneven texture, for example, can be formed by sandblasting. In this case, it is preferred that the uneven texture be formed by a sandblasting machine set for a roughness of approximately 60 grit.

Further, the purpose of setting uneven texture on the roller 30A (30B) is not to transfer a textured pattern onto the surface of the thermoplastic resin sheet P. Its sole purpose is to prevent slippage between the surface of the roller 30A (30B) and the surface of the thermoplastic resin sheet P.

In order to transfer the texture onto the surface of the thermoplastic resin sheet P, normally either one of the rollers 30A and 30B would be the texture roll while the other would be a rubber roll. In the roller pair 30 of the present embodiment, textures are added to both of the surfaces of the rollers 30A and 30B. Thus, the rollers 30A and 30B each securely grasp the corresponding surface of the thermoplastic resin sheet P. Furthermore, in the present embodiment, the pressures of the rollers 30A and 30B that are applied to the thermoplastic resin sheet P are limited. This prevents the textured pattern of the roller pair 30 from being transferred onto the surface of the thermoplastic resin sheet P, immediately after feeding the thermoplastic resin sheet P by the roller pair 30.

The rotary drive roller 30A includes a roller's rotary driving means 94 (see FIG. 23) and a roller transporting means 96. The roller's rotary driving means 94 rotates the rotary drive roller 30A around its axis. Also, the roller transporting means 96 moves the rotary drive roller 30A along a plane containing the roller pair 30, either closer toward or further away from the rotary driven roller 30B. During this movement, parallel positioning of the rotary drive roller 30A and the rotary driven roller 30B is maintained.

Figure 23:
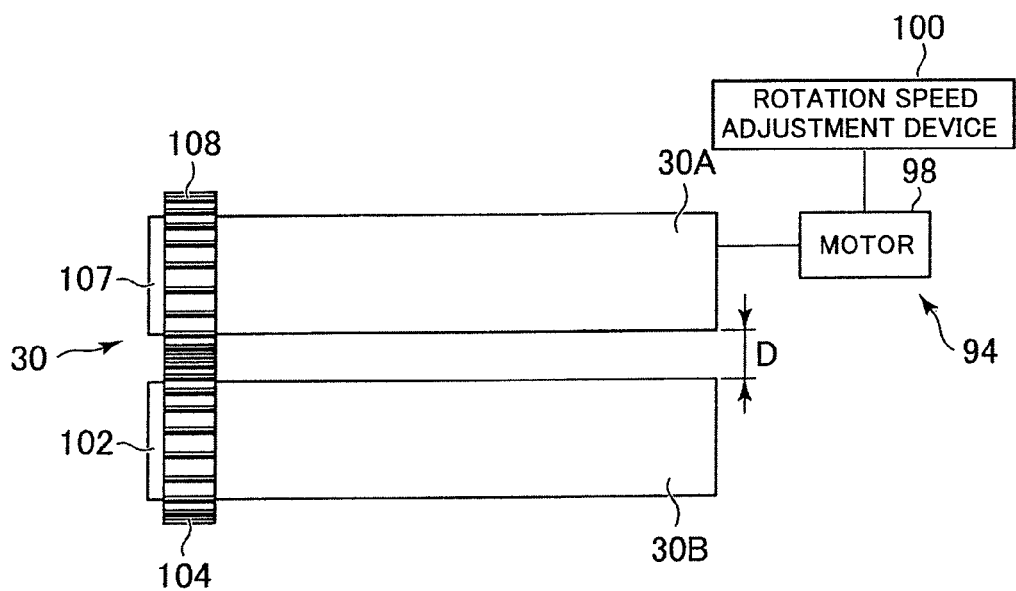
FIG. 23 shows a configuration example of a roller.

As shown in FIG. 23, the roller's rotary driving means 94 has a motor 98 linked to the rotary drive roller 30A. The torque of the motor 98, for example, is transmitted to the rotary drive roller 30A through a gear reduction mechanism (not illustrated). On the motor 98, a rotation speed adjustment device 100 is attached. The rotation speed adjustment device 100 adjusts the rotation speed of the rotary drive roller 30A. This rotation speed adjustment device 100, for example, may be used to adjust the electric current being supplied to the electric motor. The rotation speed adjustment device 100 adjusts the speed difference between the extrusion rate of the thermoplastic resin sheet P extruded from the extrusion slit, and the transmission rate of the thermoplastic resin sheet P being forwarded by the rotation of the roller pair 30, in relation to the extrusion rate of the thermoplastic resin sheet P. Assume that, for example, using the rollers 30A and 30B with a diameter of 100 mm, the thermoplastic resin sheet P having a length of 2000 mm is sent out in 15 seconds. In this case, in 1 shot (15 seconds), the rollers 30A and 30B rotate about 6.4 times. Therefore, in this case, the rotation speed of the rollers 30A and 30B (i.e., transmission rate of the thermoplastic resin sheet P) can be determined as being approximately 25.5 rpm. The transmission rate of the thermoplastic resin sheet P can easily be adjusted by increasing or decreasing the rotation speed of the rollers 30A and 30B.

In the present embodiment, as shown in FIG. 23, the rotary driven roller 30B is driven to rotate in synchronization with the rotary drive roller 30A. Therefore, the rotary driven roller 30B has a primary gear 104 near its edge on a surface 102. This primary gear 104 is provided so that it can rotate along with the rotary driven roller 30B, around the rotational axis of the rotary driven roller 30B. On the other hand, the rotary drive roller 30A has a secondary gear 108 near its edge on a surface 107. The secondary gear 108 is provided so that it can rotate along with the rotary drive roller 30A, around the rotational axis of the rotary drive roller 30A. Further, the secondary gear 108 is meshed with the primary gear 104.

As shown in FIGS. 22A and 22B, the roller transporting means 96 has a piston cylinder mechanism. One end of a piston rod 109 is linked to a cover 117 of the rotary drive roller 30A. The cover 117 rotatably supports the rotary drive roller 30A on its rotational axis. For example, by adjusting the air pressure, a piston 113 is slid against a cylinder 115. By this, the rotary drive roller 30A is moved horizontally. This enables adjustments on the distance between the roller 30A and the roller 30B.

In this case, in the present embodiment, before feeding the bottom end of the thermoplastic resin sheet P into the roller pair 30, the distance between the roller 30A and the roller 30B is expanded to be greater than the thickness of the thermoplastic resin sheet P (i.e., the rollers 30A and 30B positioned at interval D1 shown in FIG. 22A are in open position). Thus, the thermoplastic resin sheet P is smoothly supplied to the roller pair 30. After that, the interval between the roller 30A and the roller 30B is narrowed, and the thermoplastic resin sheet P is sandwiched by the roller pair 30 (i.e., the rollers 30A and 30B positioned at interval D2 shown in FIG. 22B are in closed position). After that, the thermoplastic resin sheet P is sent downward by the rotation of the roller pair 30. The stroke of the piston 113 shall be set to a length where positions of the rollers 30A and 30B can be in both open and closed positions. The teeth of the primary gear 104 protrude from the outer peripheral surface of the rotary driven roller 30B. Also, the teeth of the secondary gear 108 protrude from the outer peripheral surface of the rotary drive roller 30A. The amount of this protrusion of teeth is set so that when the rotary drive roller 30A and the rotary driven roller 30B are in the closed position (i.e., the interval between the rollers is interval D2), the roller 30B synchronizes with the roller 30A and rotates.

By this, the rotational driving force of the rotary drive roller 30A can be transferred to the rotary driven roller 30B. Thus, it is possible to forward the thermoplastic resin sheet P downward by sandwiching it between the rollers 30A and 30B, while the rotation speeds of the both rollers 30A and 30B are consistent. Also, by adjusting air pressure, pressure applied by the roller pair 30 to the thermoplastic resin sheet P, during the passage of the thermoplastic resin sheet P through the roller pair 30, can also be adjusted. The range of applied pressure is set within measures so that slippage between the surface of the roller 30A (30B) and surface of the thermoplastic resin sheet P when the roller 30A (30B) rotates, and the tearing of the thermoplastic resin sheet P by the roller pair 30, are both prevented. Thus, the thermoplastic resin sheet P is sent downward securely. The range of this applied pressure depends on the type of resin, but an example would be 0.05 MPa to 6 MPa.

The roller 30A (30B) is made of a metal, for example, aluminum. A surface temperature adjustment mechanism is included in the roller 30A (30B). This surface temperature adjustment mechanism will adjust the surface temperature of the roller 30A (30B) according to temperature of the molten thermoplastic resin sheet P. The surface temperature adjustment mechanism circulates a coolant inside the roller 30A (30B). Thus, heat exchange is gained within the roller 30A (30B). As a result, excessive heating of the surface of the roller 30A (30B), by the molten thermoplastic resin sheet P sandwiched between them, can be prevented.

Figure 24:
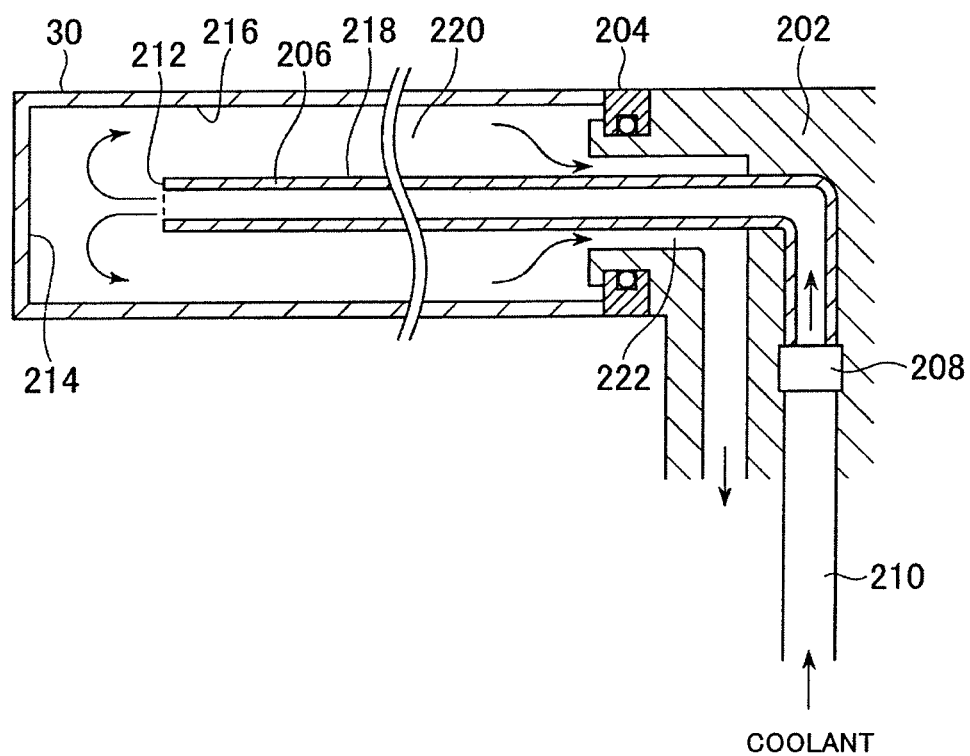
FIG. 24 shows a configuration example of a temperature regulator of a roller.

In particular, this surface temperature adjustment mechanism is set in the edge opposite to that of the gear mechanisms 104 and 108 that are located on the roller 30A (30B), as shown in FIG. 23. FIG. 24 shows the configuration example of the surface temperature adjustment mechanism. As shown in this figure, the roller 30A (30B) is rotatably attached to a fixation 202 of the surface temperature adjustment mechanism with a bearing 204. A coolant supply pipe 206 extending in the axial direction of the roller 30A (30B) is set in the interior of the roller 30A (30B) while supported by the fixation 202. The coolant supply pipe 206 is connected to a hose 210 that is connected to a coolant supply source (not illustrated), through a joint 208 within the fixation 202. The water which is the coolant, is supplied into the roller 30A (30B) passing through the hose 210 and the coolant supply pipe 206. The coolant supply pipe 206 is arranged substantially concentric with the roller 30A (30B). An open end 212 of the coolant supply pipe 206 opposes an inner surface 214 located at the edge where the gear mechanism of the roller 30A (30B) is set. Thus, the flow of the coolant supplied from the open end 212 is reversed along the inner surface 214, on the edge of the roller 30A (30B). The coolant flows inside a circular space 220 formed between an inner circumferential surface 216 of the roller 30A (30B) and an outer peripheral surface 218 of the coolant supply pipe 206 back toward the fixation 202. As a result, the coolant cools the entire surface of the roller 30A (30B) from the inside. The coolant flowing in the circular space 220 back toward the fixation 202 is eventually discharged out of the roller 30A (30B) by a drainage pipe 222 located at the fixation 202.

The outer surface of the roller 30A (30B) is heated by conduction, by coming in contact with the molten thermoplastic resin sheet P. In the above embodiment, the surface of the roller 30A (30B) is cooled from within. This prevents a situation where the molten thermoplastic resin sheet P sandwiched in the roller pair 30 sticks to the surface of the roller 30A (30B), is wrapped around the roller 30A (30B) along with rotation, and therefore is not sent down. In this case, in order to prevent wrapping, it is preferable to lower the surface temperature of the roller 30A (30B). However, if the surface temperature of the roller 30A (30B) is lowered too much the molten thermoplastic resin sheet P is supercooled by the surface. From this, difficulties may arise in the molding of the thermoplastic resin sheet P. Thus, while keeping the surface temperature of the roller 30A (30B) lower than the temperature of the molten thermoplastic resin sheet P being extruded toward it, it is necessary to set this temperature difference within a fixed temperature range. This temperature range is determined according to the type of the molten thermoplastic resin sheet P. For example, when the thermoplastic resin sheet P is amorphous resin, the fixed temperature range is approximately 80° C. to 95° C. When the thermoplastic resin sheet P is crystalline resin, the fixed temperature range is approximately 50° C. to 90° C. Furthermore, it is preferable to set the temperature of the coolant according to the type of the thermoplastic resin sheet P, when water cooling the interior of the roller 30A (30B) to adjust the surface temperature of the roller 30A (30B). It is preferred that a constant coolant temperature be maintained during molding of the thermoplastic resin sheet P.

Also, powdered inorganic fillers such as silica, mica, talc, and calcium carbonate, or fibrous inorganic fillers such as glass fibers and carbon fibers, are added to the thermoplastic resin sheet P in the present embodiment. This is to form the instrument panel duct 200 of complex shape and having the bent section 201 which is bent at a predetermined angle or more (60 degrees or more) and having an average wall thickness of 1.0 mm or less. Thus, the instrument panel duct 200 having a thin average thickness and complex shape can be formed. Further, if the volume of inorganic fillers added is too large, they tend to cause roughness and pinholes on the surface of the molded product. Therefore, in order to reduce the roughness of the surface of the molded product, and to make it more difficult to cause pinholes, the volume of inorganic fillers added should preferably be less than 30 wt %. Also, when the instrument panel duct 200 of the present embodiment is molded, it is preferred that powdered fillers, rather than fibrous fillers, be used. This is because the fibers of the fibrous fillers are oriented toward the direction of extrusion. Thus, it is harder to reduce wrinkles in the direction perpendicular to the direction of extrusion. Also, among powdered fillers, in particular, use of talc is preferred. This is because talc has a decent dispersibility in resins.

Also, in the thermoplastic resin sheet P, hydrogenated styrene thermoplastic elastomer can be added at less than 30 wt %, preferably at less than 15 wt %, in order to prevent fracture caused by impact. Styrene-ethylene-butylene-styrene block copolymers, styrene-ethylene-propylene-styrene block copolymers, hydrogenated styrene-butadiene rubber, and mixtures thereof can be used as hydrogenated styrene thermoplastic elastomers.

Also, plasticizers, stabilizers, colorants, antistatic agents, flame retardants, and foaming agents can be added into the thermoplastic resin sheet P.

Next, the molding process example of the instrument panel duct 200 in the present embodiment is explained with reference to FIGS. 1 and 14 through 17.

First, as shown in FIG. 1, the thermoplastic resin sheet P is extruded from the T-Die 28A (28B). The thickness of the extruded thermoplastic resin sheet P is adjusted by passing it through the roller pair 30. After that, the thermoplastic resin sheet P is suspended downward between the pair of the split mold block 32A and the split mold block 32B.

For the molding apparatus 1 of the present embodiment, the difference in speed between the extrusion rate of the thermoplastic resin sheet P, and the transmission rate of the thermoplastic resin sheet P being forwarded downward by the roller pair 30, is relatively adjusted by adjusting the rotation speed of the roller pair 30. Thus, thinning of the thermoplastic resin sheet P while being stretched as it is pulled downward by the roller pair 30 when passing through it is prevented, as well as incidents of draw-down and necking-in.

Also, an uneven texture is provided on the surface of the roller 30A (30B). Further, a gear mechanism is set on one edge of the roller 30A (30B). Thus, the rotational driving force of the rotary drive roller 30A is transferred to the rotary driven roller 30B. In this structure, a difference in rotation speed does not occur between the rotary drive roller 30A and the rotary driven roller 30B. Therefore, the incidents of wrinkles or shear marks appearing on the surface of the thermoplastic resin sheet P can be prevented.

Also, the roller 30A (30B) is cooled by circulating a coolant inside it. Thus, the temperature of the surface of the roller 30A (30B) is lower than the temperature of the molten thermoplastic resin sheet P, and this temperature difference is set as a predetermine temperature range. This prevents the molten thermoplastic resin sheet P, which is sandwiched between the roller pair 30, from sticking to the surface of the roller 30A (30B), and being wrapped around the roller 30A (30B) along with the rotation thereof. Further, the thermoplastic resin sheet P is held in a molten state suitable for molding.

Furthermore, it is possible to adjust the gap of the extrusion slits, along with the adjustment of the rotation speed of the roller 30A (30B).

As shown in FIG. 1, after positioning the two thermoplastic resin sheets P between the split mold block 32A and the split mold block 32B, as shown in FIG. 14, the frame 33A (33B) of the split mold block 32A (32B) is shifted toward the thermoplastic resin sheet P. Thus, the frame 33A (33B) located along the perimeter of the split mold block 32A (32B) comes into contact with the side of the thermoplastic resin sheet P. Thus a closed space is formed by the thermoplastic resin sheet P, the frame 33A (33B), and the cavity surface 116A (116B).

Next, as shown in FIG. 15, the air in the closed space is sucked out from the vacuum suction chamber 120 through the suction hole 122. Thus, the thermoplastic resin sheet P is adsorbed onto the cavity surface 116A (116B). As a result, the thermoplastic resin sheet P is shaped along the cavity surface 116A (116B).

Further, the thickness of the thermoplastic resin sheet P before suction is uniform in the vertical direction. Thus, it is possible to prevent poor shaping caused by variance in the thickness due to blow ratios.

Next, as shown in FIG. 16, the split mold block 32A and the split mold block 32B are moved with the respective frames 33A and 33B, so that they are closer to each other. Thus, the split mold block 32A and the split mold block 32B are closed shut. After that, the peripheral of the thermoplastic resin sheet P is fused by the pinch-off molding part 118 of the split mold block 33. Thus, a parting line is formed along the joined surfaces of the two thermoplastic resin sheets P. Further, a sealed hollow section 151 is formed between the two thermoplastic resin sheets P.

Next, as shown in FIG. 17, the split mold block 32A and the split mold block 32B, along with the respective frames 33A and 33B, are moved away from each other. This opens the split mold blocks 32A and 32B, for removal of the duct and removal of peripheral burrs. In this way, the instrument panel duct 200, as shown in FIGS. 12A and 12B, can be molded.

EXAMPLES

Next, Examples of the above mentioned embodiments are explained. However, the following are only some examples. The technical concepts of the present embodiment are not limited to the examples listed below.

In the molding method mentioned above, as shown in FIGS. 1, and 14 through 17, the instrument panel duct 200 of complex shape having the bent section 201, as shown in FIGS. 12A and 12B, was molded, while appropriately adjusting the relation between the extrusion rate of the thermoplastic resin sheet P being extruded from the extrusion slit, and the transmission rate of the thermoplastic resin sheet P forwarded by the roller pair 30. Further, the extrusion rate of the thermoplastic resin sheet P being extruded from the extrusion slit was adjusted within the range of 15 to 45 mm/s. The transmission rate of the thermoplastic resin sheet P by the roller pair 30 was adjusted within the range of 80 to 125 mm/s.

Also, the instrument panel duct 200 was molded using the following materials.

Product "SunAllomer grade PB170A (MFR=0.35 g/10 minutes)" manufactured by SunAllomer Ltd., was used as the polypropylene resin. The MFR value is measured under the testing temperature of 230° C., and with a testing load of 2.16 kg, in accordance with JIS K-7210.

Also, the content of talc was 10 wt %. The particle size of the talc used was 6 to 7 μm. Furthermore, it is preferable that the particle size of talc be within the range of 2 to 30 μm. Thus, dispersion of talc in the resin is comparatively better.

Also, a roller made of aluminum was used as the roller 30A (30B). The diameter of the roller was 100 mm. An uneven texture was formed on the surface of the roller 30A (30B) by sandblasting.

Also, the width of the extrusion slit was 1.0 mm.

In the molding method mentioned above, as shown in FIGS. 1, and 14 through 17, the instrument panel duct 200 of complex shape having the bent section 201 as shown in FIGS. 12A and 12B was molded, while appropriately adjusting the relation between the extrusion rate of the thermoplastic resin sheet P being extruded from the extrusion slit, and the transmission rate of the thermoplastic resin sheet P forwarded by the roller pair 30. The average thickness (t) of the molded product is shown in FIG. 25. The average thickness (t) is an average value of thicknesses measured at the 14 points of points 12 through 18, and 25 through 31 located on the first side of the instrument panel duct 200, as shown in FIG. 12A, and the thicknesses measured at the 12 points of points 18 through 23, and 30 through 35 located on the second side of the instrument panel duct 200, as shown in FIG. 12B.

The meanings of symbols A, B, C, and D used in FIG. 25, are described below.

A: when average thickness (t) is 0.6 or less
B: when average thickness (t) is greater than 0.6 and 1.0 or less
C: when average thickness (t) is greater than 1.0
D: where pinholes occurred
<Result Shown in FIG. 25>

From the result shown in FIG. 25, it was found that the instrument panel duct 200 (having an average thickness (t) of 1.0 or less and no pinholes) with an evaluation rating of B or A could be molded, when the relation between the extrusion rate of the thermoplastic resin sheet P being extruded from the extrusion slits, and the transmission rate of the thermoplastic resin sheet P by the roller pair 30, fulfills either one of the conditional expressions (A) and (B) listed below in molding the instrument panel duct 200 having the bent section 201 as shown in FIGS. 12A and 12B.

when $Va<110, 3.0 \leq Va/Vb \leq 5.5$    Condition expression (A)

when $Va \geq 110, 3.0 \leq Va/Vb < 605/Va$    Conditional expression (B)

where,

Va: transmission rate (mm/s) of the thermoplastic resin sheet P by the roller pair 30

Vb: extrusion rate (mm/s) of the thermoplastic resin sheet P being extruded from the extrusion slit Also, 605/Va is considered as fulfilling the condition 605/Va>3.0 (mm/s).

Note that, when the transmission rate Va of the thermoplastic resin sheet P by the roller pair 30 is 110 (mm/s) or more, variations in thickness appear in the thermoplastic resin sheet P, along with an increased tendency of pinholes forming. As a result, in this case, it was discovered that the range of the above mentioned conditions in which the instrument panel duct 200 could be molded to achieve an evaluation rating of B or A was narrowed. Also, when the extrusion rate Va is 90 (mm/s) or less, the wall thickness of the molded products tends to be thicker. As a result, in this case, it was discovered that the range of the above mentioned conditions in which the instrument panel duct 200 could be molded to achieve an evaluation rating of B or A was narrowed. In this way, from the result as shown in FIG. 25, it was discovered that it was preferable that the transmission rate Va of the thermoplastic resin sheet P by the roller pair 30 fulfill the condition $90<Va<110$ in the conditional expression (A) mentioned above. By fulfilling this condition, as shown in FIG. 25, the range of the above conditions in which the instrument panel duct 200 can be molded to achieve an evaluation rating of B or A widens.

Also, from the results shown in FIG. 25, it was discovered that in the conditional expression (A) mentioned above, it was preferred to be $5.0 \leq Va/Vb < 5.5$. Due to this, the instrument panel duct 200, with a uniform thickness of 0.6 mm or less, can be molded.

Further, in the Example above, the thermoplastic resin sheet P, having MFR of 0.35 g/10 minutes and talc content of 10 wt %, was molded. However, the thermoplastic resin sheet P that fulfills the conditions of having an MFR of 0.1 to 3.5 g/10 minutes, and a talc content of less than 30 wt %, can also be used. Also in this case, by adjusting the extrusion rate of the thermoplastic resin sheet P being extruded from the extrusion slit, and the transmission rate of the thermoplastic resin sheet P by the roller pair 30, to fulfill the conditional expression in the example above, it becomes possible to control the variations in thickness of the thinned thermoplastic resin sheet P, and in turn mold the instrument panel duct 200 having a thin uniform thickness.

Also, in the above embodiment, a hollow molded duct was explained. However, the present embodiment can also be applied to the non-hollow shaping of a duct using a single sheet.

(Fourth Embodiment)

Next, a fourth embodiment is explained.

<Outline of Duct of Fourth Embodiment>

Figure 26A:
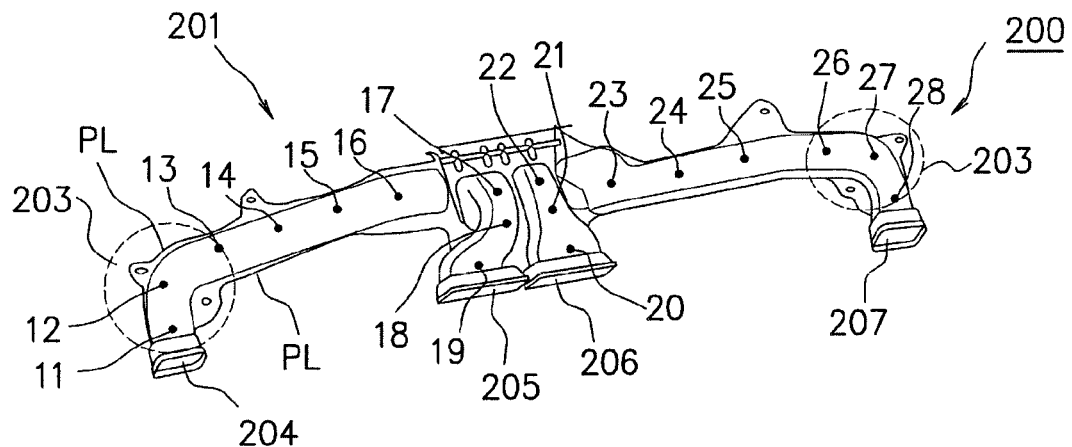
FIGS. 26A and 26B show configuration examples of an instrument panel duct in a fourth embodiment.
Figure 26B:
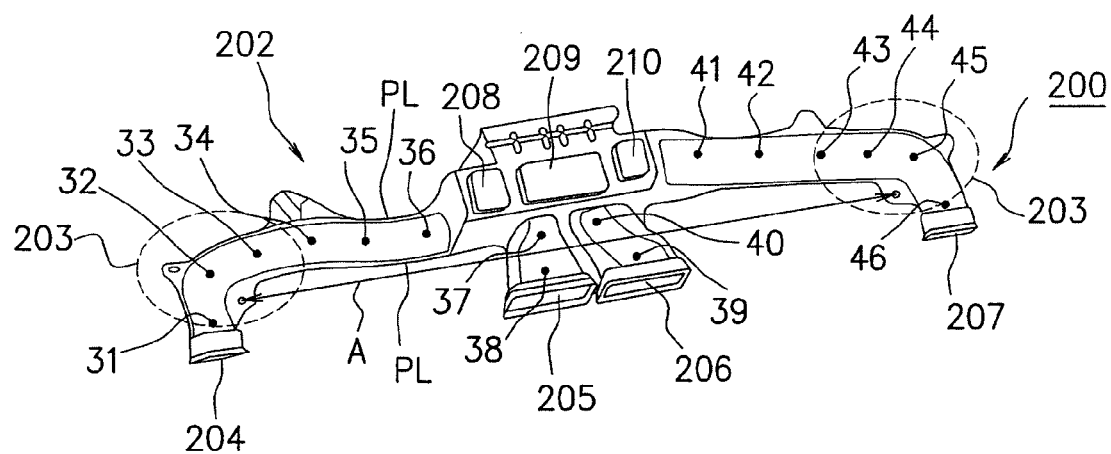

First, with reference to FIGS. 26A and 26B, an outline of the duct of the fourth embodiment is explained.

The duct 200 of the present embodiment has the first wall 201 and the second wall 202, bonded at the parting line PL.

In the duct 200 of the present embodiment, the difference between the average thickness of the first wall 201 and the average thickness of the second wall 202 is 0.3 mm or less. The variation coefficient of the thickness of the entire duct 200 is 0.3 or less. In this case, the variation coefficient is the value obtained by dividing the standard deviation of thickness obtained from the thickness of the first wall 201 and the thickness of the second wall 202 by the average value of the thickness obtained from the thickness of the first wall 201 and the thickness of the second wall 202 (variation coefficient=standard deviation of thickness/average value of thickness).

The duct 200 of the present embodiment prevents warping in the molded duct 200 by having the configuration mentioned above. Below, with reference to the attached drawings, the duct 200 of the present embodiment is explained in detail. However, in this following embodiment, a case where the instrument panel duct 200, shown in FIGS. 26A and 26B, is molded as the duct 200 is used as an example for the explanation.

<Configuration Example of Instrument Panel Duct 200>

First, with reference to FIGS. 26A and 26B, the configuration example of the instrument panel duct 200 is explained. FIG. 26 shows the configuration example of the instrument panel duct 200 of the present embodiment. FIG. 26A shows the side of the first wall 201 of the instrument panel duct 200. FIG. 26B shows the side of the second wall 202 of the instrument panel duct 200.

The instrument panel duct 200 of the present embodiment has the first wall 201 and the second wall 202, bonded at the parting line PL.

The average thickness of the first wall 201 and the second wall 202, that configure the instrument panel duct 200 of the present embodiment, is 0.3 to 1.2 mm. The difference in thickness between the first wall 201 and the second wall 202 is 0.3 mm or less. Also, the variation coefficient of the thickness of the entire instrument panel duct 200 is 0.3 or less.

The average thickness signifies an average value taken from the results of measuring thicknesses at a plurality of points set at equal intervals of approximately 100 mm along the extending length of the duct. Note that, if the duct is hollow, the thickness of the section perpendicular to parting line PL is measured along the first wall 201 and the second wall 202 bonded at the parting line PL. The average value of thicknesses measured is the average thickness. However, sections compressed by the split mold blocks, such as the flange, are not to be included among measuring points. The extending length refers to a direction in which the hollow space extends, and is a direction in which fluids will flow. The section perpendicular to the parting line PL signifies a fixed position along the walls of the duct. This section is the section intersecting with a line X that passes through a center point of a line segment connecting one parting line L1 and another parting line L2 and is perpendicular to the line segment, in a cross section perpendicular to the extending length (see FIG. 28) of the duct.

Furthermore, the average thickness on the side of the first wall 201 of the instrument panel duct 200 of the present embodiment is an average value of thicknesses measured at the 18 points of positions 11 to 19, and 20 to 28, as shown in FIG. 26A, on the side of the first wall 201 of the instrument panel duct 200. Also, the average thickness on the side of the second wall 202 is an average value of thicknesses measured at the 16 points of positions 31 to 38, and 39 to 46, as shown in FIG. 26B, on the side of the second wall 202 of the instrument panel duct 200. The average thickness of the entire instrument panel duct 200 is the average value of the average thickness on the side of the first wall 201 and the average thickness on the side of the second wall 202.

The variation coefficient of thickness of the entire instrument panel duct 200 shows the variations in measurements of thicknesses taken at a plurality of positions on the duct, set at equal intervals of approximately 100 mm along the extending length. This variation coefficient is a value obtained by dividing the standard deviation of thickness measured at each position on the duct, by the average value of thickness of each position (variation coefficient=standard deviation of thickness/average value of thickness). Furthermore, the section of measuring the thickness is the section perpendicular to the parting line PL.

The instrument panel duct 200 of the present embodiment has a hollow part inside the duct. Fluids such as air circulate through this hollow part. Furthermore, the shapes shown in FIGS. 26A and 26B are examples of the instrument panel ducts of the present embodiment. The shape of the instrument panel duct of the present embodiment is not limited to the shapes shown in FIGS. 26A and 26B. In the present embodiment, it is possible to mold ducts in various shapes. Also shown in FIGS. 26A and 26B are openings 204 through 210. The fluid circulates within the instrument panel duct 200 through these openings. Also, the distance A shown in FIG. 26B is the distance between the flanges located on both ends of the instrument panel duct 200. The instrument panel duct 200 of the present embodiment is molded in the same way as in the third embodiment mentioned above.

EXAMPLES

Next, Examples of the embodiment mentioned above are explained. However, the following examples are only some examples. The technical concepts of the present embodiment are not limited to these following examples.

With the same method of molding as that of the third embodiment mentioned above, by appropriately changing the relation between the extrusion rate of the thermoplastic resin sheet P being extruded from the extrusion slit, and the transmission rate of the thermoplastic resin sheet P by the roller pair 30, the instrument panel duct 200 of complex shape and having bent section 203, as shown in FIGS. 26A and 26B, was molded.

The instrument panel ducts 200 were molded using the following materials.

Product "SunAllomer grade PB170A (MFR=0.35 g/10 minutes)" manufactured by SunAllomer Ltd., was used as the polypropylene resin. The value of the MFR is the value measured under the testing temperature of 230° C., with a testing load of 2.16 kg, in accordance with JIS K-7210.

Also, the content of talc was 10 wt%. The particle size of the talc used was 6 to 7 μm. Furthermore, it is preferable that the particle size of talc be within the range of 2 to 30 μm. This makes dispersion of talc in the resin comparatively better.

Also, a roller made of aluminum was used as the roller 30A (30B). The diameter of the roller was 100 mm. In addition, an uneven texture was formed on the surface of the roller 30A (30B) by sandblasting.

With the same method of molding as that of the third embodiment mentioned above, the thickness of the thermoplastic resin sheet P was appropriately adjusted by appropriately changing the relation between the extrusion rate of the thermoplastic resin sheet P being extruded from the extrusion slit, and the transmission rate of the thermoplastic resin sheet P by the roller pair 30. In this way, the instrument panel duct 200 of complex shape and having the bent section 203, as shown in FIGS. 26A and 26B, is molded. The average thickness, difference in thickness, variation coefficient, weight, changes in flange spacing, and changes in the opening of the molded products are shown in FIG. 27. The changes in flange spacing shown in FIG. 27 show the changes of the spacing of the flange A, shown in FIG. 26B. The changes in the opening, as shown in FIG. 27, show the changes in the openings 204 through 210, as shown in FIGS. 26A and 26B. The changes in flange spacing and changes in openings were measured as follows. That is, the instrument panel duct 200 was stored in a thermostat with a thermal cycle of three hours at −30° C. to three hours at 80° C. to three hours at room temperature. The flange spacing and dimensions of the opening before this thermal cycle, and the flange spacing and dimensions of the opening after this thermal cycle, were measured. Then, the difference in measured value between the former and the latter was determined as the change in flange spacing and change in openings.

Example 1 as shown in FIG. 27 is the instrument panel duct 200, as shown in FIGS. 26A and 26B, molded to weigh 964 g. Example 2 is the instrument panel duct 200 molded to weigh 800 g. Example 3 is the instrument panel duct 200 molded to weigh 724 g. Example 4 is the instrument panel duct 200 molded to weigh 640 g. Example 5 is the instrument panel duct 200 molded to weigh 715 g.

The average thicknesses as shown in FIG. 27 are the average thickness (upper side) on the side of the first wall 201, average thickness (lower side) on the side of the second wall 202, and the average thickness (upper and lower average) on the side of the first wall 201 and the side of the second wall 202. Also, the difference in thickness is the difference in thickness between the first wall 201 and the second wall 202 (upper and lower thickness difference).

The average thickness (upper side) on the side of the first wall 201 is the average value of thicknesses measured at the 18 points of positions 11 to 19, and 20 to 28 along the side of the first wall 201 of the instrument panel duct 200 as shown in FIG. 26A. The average thickness (lower side) on the side of the second wall 202 is the average value of thicknesses measured at the 16 points of positions 31 to 38, and 39 to 46 along the side of the second wall 202 of the instrument panel duct 200 as shown in FIG. 26B. The average thickness (upper and lower average) on the side of the first wall 201 and the side of the second wall 202 is the average between the average thickness (upper side) on the side of the first wall 201 and the average thickness (lower side) on the side of the second wall 202.

The difference in thickness is a difference between the average thickness (upper side) on the side of the first wall 201 and the average thickness (lower side) on the side of the second wall 202.

The variation coefficient, as shown in FIG. 27, indicates the variation coefficient of the thickness of the entire instrument panel duct 200, as shown in FIG. 26A. In measuring the variation coefficient, measurements of thickness were made at a total of 34 points, including the 18 points, as shown in FIG. 26A, at positions 11 to 19, and 20 to 28 on the side of the first wall 201 of the instrument panel duct 200, and the 16 points, as shown in 26B, of the positions 31 to 38, and 39 to 46 on the side of the second wall 202 of the instrument panel duct 200. The variation coefficient was determined by dividing the standard deviation calculated from these measurements, by the average thickness on the side of the first wall 201 and the side of the second wall 202 mentioned above (variation coefficient=standard deviation/average thickness).

Example 1

As for the instrument panel duct 200 of Example 1, as shown in FIG. 27, the average thickness (lower side) on the side of the second wall 202 that configures the instrument panel duct 200 was 0.900 mm. The average thickness on the side of the first wall 201 (upper side) was 1.020 mm. The average thickness (upper and lower average) on the side of the first wall 201 and the side of the second wall 202 was 0.960 mm. Also, the thickness difference (upper and lower thickness difference) between the first wall 201 and the second wall 202 is 0.120 mm.

Also, the variation coefficient of thickness of the entire instrument panel duct 200 in Example 1 was 0.271.

Example 2

As for the instrument panel duct 200 of Example 2, as shown in FIG. 27, the average thickness (lower side) on the side of the second wall 202 that configures the instrument panel duct 200 was 0.682 mm. The average thickness on the side of the first wall 201 (upper side) was 0.808 mm. The average thickness (upper and lower average) on the side of the first wall 201 and the side of the second wall 202 was 0.745 mm. Also, the thickness difference (upper and lower thickness difference) between the first wall 201 and the second wall 202 was 0.126 mm.

Also, the variation coefficient of thickness of the entire instrument panel duct 200 in Example 2 was 0.266.

Example 3

In the instrument panel duct 200 of Example 3, as shown in FIG. 27, the average thickness (lower side) on the side of the second wall 202 configuring the instrument panel duct 200 was 0.580 mm. The average thickness on the side of the first wall 201 (upper side) was 0.710 mm. The average thickness (upper and lower average) on the side of the first wall 201 and the side of the second wall 202 was 0.645 mm. Also, the thickness difference (upper and lower thickness difference) between the first wall 201 and the second wall 202 was 0.130 mm.

Also, the variation coefficient of thickness of the entire instrument panel duct 200 of Example 3 was 0.260.

Example 4

In the instrument panel duct 200 of Example 4, as shown in FIG. 27, the average thickness (lower side) on the side of the second wall 202 configuring the instrument panel duct 200 was 0.495 mm. The average thickness on the side of the first wall 201 (upper side) was 0.574 mm. The average thickness (upper and lower average) on the side of the first wall 201 and the side of the second wall 202 was 0.535 mm. Also, the thickness difference (upper and lower thickness difference) between the first wall 201 and the second wall 202 was 0.079 mm.

Also, the variation coefficient of thickness of the entire instrument panel duct 200 of Example 4 was 0.252.

Example 5

In the instrument panel duct 200 of Example 5, as shown in FIG. 27, the average thickness (lower side) on the side of the second wall 202 configuring the instrument panel duct 200 was 0.497 mm. The average thickness on the side of the first wall 201 (upper side) was 0.770 mm. The average thickness (upper and lower average) on the side of the first wall 201 and the side of the second wall 202 was 0.634 mm. Also, the thickness difference (upper and lower thickness difference) between the first wall 201 and the second wall 202 was 0.273 mm.

Also, the variation coefficient of thickness of the entire instrument panel duct 200 of Example 5 was 0.250.

Comparative Example 1

In the molding of the instrument panel duct 200 of Comparative Example 1, similar to the molding method of the third embodiment mentioned above, the thickness of the thermoplastic resin sheet P was appropriately adjusted by appropriately changing the relation between the extrusion rate of the thermoplastic resin sheet P being extruded from the extrusion slit, and the transmission rate of the thermoplastic resin sheet P by the roller pair 30. Thus, the instrument panel duct 200, as shown in FIGS. 26A and 26B, having a weight of 731 g was molded.

In the instrument panel duct 200 of Comparative Example 1, as shown in FIG. 27, the average thickness (lower side) on the side of the second wall 202 configuring the instrument panel duct 200 was 0.490 mm. The average thickness on the side of the first wall 201 (upper side) was 0.820 mm. The average thickness (upper and lower average) on the side of the first wall 201 and the side of the second wall 202 was 0.655 mm. Also, the thickness difference (upper and lower thickness difference) between the first wall 201 and the second wall 202 was 0.330 mm.

Also, the variation coefficient of thickness of the entire instrument panel duct 200 of Comparative Example 1 was 0.260.

Comparative Example 2

In the molding of the instrument panel duct 200 of Comparative Example 2, the parison blow molding method was used. Thus, the instrument panel duct 200, as shown in FIGS. 26A and 26B, having a weight of 1130 g was molded.

In the instrument panel duct 200 of Comparative Example 2, as shown in FIG. 27, the average thickness (lower side) on the side of the second wall 202 configuring the instrument panel duct 200 was 1.012 mm. The average thickness on the side of the first wall 201 (upper side) was 1.284 mm. The average thickness (upper and lower average) on the side of the first wall 201 and the side of the second wall 202 was 1.148 mm. Also, the thickness difference (upper and lower thickness difference) between the first wall 201 and the second wall 202 was 0.272 mm.

Also, the variation coefficient of thickness of the entire instrument panel duct 200 of Comparative Example 2 was 0.326.

<Comparison Results>

Examples 1 through 5 were compared with Comparative Example 1. As a result, it was found that the smaller the thickness difference (upper and lower thickness difference) between the first wall 201 and the second wall 202, the smaller the effect on the change of flange spacing of the instrument panel duct 200, as shown in FIGS. 26A and 26B. For example, it was found that in Example 4 where the thickness difference was the smallest, the change of flange spacing was the smallest, and in Comparative Example 1 where the thickness difference was the largest, the change of the flange spacing was the largest.

Also, Examples 1 through 5 were compared. As a result, it was found that the thinner the average thickness (upper and lower average) between the side of the first wall 201 and the side of the second wall 202, the smaller the effect on the change of openings of the instrument panel duct 200, as shown in FIGS. 26A and 26B. For example, it was found that in Example 4 where the average thickness was the smallest, the change of openings was the smallest, and in Example 1 where the average thickness was the largest, change of openings was the largest.

Also, Example 5 and Comparative Example 2 were compared. In Comparative Example 2, the thickness difference between the first wall 201 and the second wall 202 is small (0.3 mm or less). On the other hand, the variation coefficient of thickness of the entire instrument panel duct 200 is large (more than 0.3). Thus, it was found that in Comparative Example 2, the effect on change of flange spacing of the instrument panel duct 200, as shown in FIGS. 26A and 26B, was large and the effect on change of openings was also large.

From the results of Examples 1 to 5, and Comparative Examples 1 and 2, it was found that, when the conditions that variation coefficient of thickness of the entire instrument panel duct 200 is 0.3 or less, and thickness difference between the first wall 201 and the second wall 202 is 0.3 mm or less, are fulfilled, the effect on the change of flange spacing and change of openings of the instrument panel duct 200, as shown in FIGS. 26A and 26B, was small. Thus, by fulfilling the above conditions, occurrence of warping in the molded instrument panel duct 200 can be prevented.

Also, in Examples 1 and 2, the average thickness (upper and lower average) of the first wall 201 and the second wall 202 exceeds 0.7 mm. In Examples 3 and 4 where the corresponding average thickness is 0.7 mm or less, when compared to Examples 1 and 2, the change of openings becomes significantly small. From this, it is preferred that the average thickness of the first wall 201 and the second wall 202 be 0.7 mm or less. Thus, the cooling time difference of the duct's inner and outer surfaces becomes smaller. Thus, the dimensional stability against heat of the duct can be increased. As a result, occurrence of warping in the molded instrument panel duct 200 can be prevented.

<Operation/Effect of Instrument Panel Duct 200 of the Present Embodiment>

In this way, in the instrument panel duct 200 of the present embodiment, the variation coefficient of thickness of the entire instrument panel duct 200 is 0.3 or less. Further, the thickness difference between the first wall 201 and the second wall 202 is 0.3 mm or less. Thus, occurrence of warping in the molded instrument panel duct 200 can be prevented.

Further, in the molding of the instrument panel duct 200 of the present embodiment, it is preferred to use direct sheet molding as mentioned above. In the direct sheet molding, the thickness of both the first wall 201 and the second wall 202 can be adjusted. Thus, even when the difference in average blow ratio between the first wall 201 and the second wall 202 is large (for example, when 0.05 or more), the thickness difference between the walls can be made smaller. Thus, the deformation of the instrument panel duct 200 caused by thermal cycle can be controlled. Thus, the instrument panel duct 200, having less deformation by thermal cycle and high shaping flexibility, can be molded.

For example, it is also possible to mold the instrument panel duct 200 of the present embodiment by parison blow molding. In this case, when the difference in average blow ratio between the first wall 201 and the second wall 202 is large (for example, 0.05 or more), the thickness difference between the first wall 201 and the second wall 202 becomes significantly large. Thus, the deformation of the instrument panel duct 200 by thermal cycle also becomes significantly larger.

On the other hand, when the instrument panel duct 200 of the present embodiment is molded by the direct sheet molding, both thicknesses of the first wall 201 and the second wall 202 can be adjusted. Thus, even when the difference in average blow ratio between the first wall 201 and the second wall 202 is large (for example, when 0.05 or more), thickness difference between the walls can be made small. Thus, it is possible to control deformation of the instrument panel duct 200 caused by thermal cycle. Particularly, when the difference in average blow ratio is 0.1 or more, the inhibitory effect on deformation becomes large.

Further, in the present embodiment, the blow ratio for example is a ratio (B/A) of length A of a line segment connecting one parting line L1 and another parting line L2, and the distance B between this line segment and inner wall surface farthest from this line segment in a cross-section perpendicular to its extending length, as shown in FIG. 28. As shown in FIG. 28, when it can be seen that there is unevenness in the shape of the cross-sectional surface, the blow ratio becomes 0.5. Also, the average blow ratio is the average value of measurements of the blow ratio, at a plurality of positions at equal intervals of approximately 100 mm along the extending length of the duct.

Also, in many cases, ducts providing cooled air or clean air are installed along the wall surface or to avoid surrounding obstacles. For this reason, in many cases, the ducts have a winding shape. If a duct of such shape is molded by blow molding, the blow ratio difference, between parts having a high blow ratio and parts having a low blow ratio, along walls of the duct becomes large. Thus, there is a problem in that thinner parts, and additionally pinholes, tend to occur. Accordingly, when the difference in the blow ratio is large, in order to prevent the occurrence of pinholes, in general, the thickness set in blow molding is thicker overall. Particularly, when foamed resin is blow molded, compared to a case where non-foamed resin is used, growth of parison is reduced. Thus, in order to prevent the occurrence of pinholes, the set thickness is forced to be thicker. As a result, when the difference in average blow ratio between the first wall 201 and the second wall 202 is large, the thickness difference of the duct becomes large. Thus, warping may occur in the duct.

On the other hand, when a duct is molded by the direct sheet molding, the thickness of both the first wall 201 and the second wall 202 can be adjusted. Thus, even though the difference in the average blow ratio between the first wall 201 and the second wall 202 is large, the thickness difference between both can be reduced. Thus, it is possible to prevent occurrence of warping in the duct.

It is noted that the above-described embodiments are preferred embodiments of the present invention. The scope of the present invention is not limited to the above-described embodiments. The present invention can be implemented in various modified modes without departing from the gist of the present invention.

What is claimed is:

1. A duct molding method, comprising:
providing molds having cavity surfaces;
positioning a pair of molten thermoplastic resin sheets between the molds, including extruding the molten thermoplastic resin sheets, by adjusting a thickness of the molten thermoplastic resin sheets by sandwiching and expanding the thermoplastic resin sheets by a pair of rollers and forwarding downward the thermoplastic resin sheets by rotating the rollers;
bonding the thermoplastic resin sheets to a frame by drawing the frame positioned on a perimeter of the molds closer to the thermoplastic resin sheets and sucking the thermoplastic resin sheets by a suction part provided in the frame such that a closed space is defined between the thermoplastic resin sheets and the cavity surfaces of the molds; and
adsorbing the thermoplastic resin sheets onto the cavity surfaces of the molds with a vacuum while the sheets are warm from extrusion and closing the molds to mold a duct,
wherein the duct has a first wall and a second wall adhering to each other along a parting line, wherein a difference between an average thickness of the first wall and an average thickness of the second wall is no more than 0.3 mm, and wherein a variation coefficient of the thickness of the entire duct is no more than 0.3 mm, wherein the thermoplastic resins sheets comprise polypropylene and olefin block copolymer.

2. The duct molding method according to claim 1, wherein while positioning,
the thermoplastic resin sheets are positioned between the molds by supplying a thermoplastic resin, mixed with a foaming agent and stored in an accumulator, to a T-die by using a plunger, at a fixed interval, and extruding the molten thermoplastic resin sheets having an air cell from the T-die.

3. The duct molding method according to claim 1, wherein the thermoplastic resin sheets further comprise polyethylene and a foaming agent.

4. A duct molding method, comprising:
providing molds having cavity surfaces;
positioning a pair of molten thermoplastic resin sheets between the molds including extruding the molten thermoplastic resin sheets; and
adsorbing the thermoplastic resin sheets onto the cavity surfaces of the molds with a vacuum while the sheets are warm from extrusion and closing the molds to mold a duct,
wherein the positioning comprises:
melting and mixing a thermoplastic resin mixed with an inorganic filler and extruding the thermoplastic resin in a sheet form, and
adjusting a thickness of the molten thermoplastic resin sheets by sandwiching and expanding the thermoplastic resin sheets by a pair of rollers and forwarding the thermoplastic resin sheets by rotating the rollers, and
wherein the method satisfying the following condition:

$W \geq 2M^2 - 11M + 18$ where
M: Melt flow rate (g/10 minutes) of the thermoplastic resin at 230° C., and W: Inorganic filler volume (wt%) mixed into the thermoplastic resin.

5. A duct molding method, comprising:
providing molds having cavity surfaces;
positioning a pair of molten thermoplastic resin sheets between the molds including extruding the molten thermoplastic resin sheets; and
adsorbing the thermoplastic resin sheets onto the cavity surfaces of the molds with a vacuum while the sheets are warm from extrusion and closing the molds to mold a duct,
wherein the positioning comprises:
suspending downward the molten thermoplastic resin sheets by extruding a melted, mixed thermoplastic resin in sheet form; and
adjusting a thickness of the molten thermoplastic resin sheets by sandwiching and expanding the thermoplastic resin sheets by a pair of rollers and forwarding downward the thermoplastic resin sheets by rotating the rollers,
the method satisfying the following condition (A) or (B):

when $Va<110$, $3.0 \leq Va/Vb \leq 5.5$     Condition expression (A)

when $Va \geq 110$, $3.0 \leq Va/Vb < 605/Va$     Conditional expression (B)

where
Va: transmission rate (mm/s) of the thermoplastic resin sheets by the rollers, and
Vb: extrusion rate (mm/s) of the thermoplastic resin sheets.

6. A duct molding method, comprising:
providing molds having cavity surfaces;
positioning a pair of molten thermoplastic resin sheets between the molds, including extruding the molten thermoplastic resin sheets, by adjusting a thickness of the molten thermoplastic resin sheets by sandwiching and expanding the thermoplastic resin sheets by a pair of rollers and forwarding downward the thermoplastic resin sheets by rotating the rollers;
bonding the thermoplastic resin sheets to a frame by drawing the frame positioned on a perimeter of the molds closer to the thermoplastic resin sheets and sucking the thermoplastic resin sheets by a suction part provided in the frame such that a closed space is defined between the thermoplastic resin sheets and the cavity surfaces of the molds; and
adsorbing the thermoplastic resin sheets onto the cavity surfaces of the molds with a vacuum while the sheets are warm from extrusion and closing the molds to mold a duct, wherein an average thickness of the duct is no more than 0.7 mm, wherein the thermoplastic resin sheets comprise polypropylene and olefin block copolymer.

7. The duct molding method according to claim 6, wherein while positioning, the thermoplastic resin sheets are positioned between the molds by supplying a thermoplastic resin, mixed with a foaming agent and stored in an accumulator, to a T-die by using a plunger, at a fixed interval, and extruding the molten thermoplastic resin sheets having an air cell from the T-die.

8. The duct molding method according to claim 6, wherein the thermoplastic resin sheets polyethylene, a foaming agent.

* * * * *

UNITED STATES PATENT AND TRADEMARK OFFICE
CERTIFICATE OF CORRECTION

Page 1 of 1

PATENT NO. : 9,079,352 B2
APPLICATION NO. : 13/230150
DATED : July 14, 2015
INVENTOR(S) : T. Sumi et al.

It is certified that error appears in the above-identified patent and that said Letters Patent is hereby corrected as shown below:

IN THE CLAIMS

Column 41, line 50 (claim 1, line 27) please change "resins sheets" to -- resin sheets --

Column 43, line 13 (claim 8, line 2) please change "polyethylene," to -- further comprise polyethylene and --

Signed and Sealed this
First Day of March, 2016

Michelle K. Lee
*Director of the United States Patent and Trademark Office*